US011408741B2

(12) United States Patent
Miyake et al.

(10) Patent No.: US 11,408,741 B2
(45) Date of Patent: Aug. 9, 2022

(54) SELF-LOCALIZATION ESTIMATION DEVICE

(71) Applicant: DENSO CORPORATION, Kariya (JP)

(72) Inventors: Kenji Miyake, Kariya (JP); Yuichi Minamiguchi, Kariya (JP); Kenta Takahashi, Kariya (JP); Minoru Okada, Kariya (JP); Kazuyoshi Isaji, Kariya (JP); Tatsumi Sugiyama, Kariya (JP)

(73) Assignee: DENSO CORPORATION, Kariya (JP)

(*) Notice: Subject to any disclaimer, the term of this patent is extended or adjusted under 35 U.S.C. 154(b) by 263 days.

(21) Appl. No.: 16/568,637

(22) Filed: Sep. 12, 2019

(65) Prior Publication Data

US 2020/0003563 A1    Jan. 2, 2020

Related U.S. Application Data

(63) Continuation of application No. PCT/JP2018/010057, filed on Mar. 14, 2018.

(30) Foreign Application Priority Data

Mar. 16, 2017 (JP) ............................. JP2017-051066
Dec. 26, 2017 (JP) ............................. JP2017-248744
Dec. 26, 2017 (JP) ............................. JP2017-248745

(51) Int. Cl.
*B60W 30/18* (2012.01)
*G01C 21/30* (2006.01)
(Continued)

(52) U.S. Cl.
CPC ..... *G01C 21/3407* (2013.01); *B60W 30/18163* (2013.01); *G01C 21/30* (2013.01);
(Continued)

(58) Field of Classification Search
None
See application file for complete search history.

(56) References Cited

U.S. PATENT DOCUMENTS 5,633,564 A    5/1997 Edwards et al.
9,423,260 B2 *  8/2016 Stahlin .................. G01C 21/26
(Continued)

FOREIGN PATENT DOCUMENTS

JP    2008-249639 A    10/2008
JP    2010-078387 A     4/2010
(Continued)

*Primary Examiner* — Todd Melton
(74) *Attorney, Agent, or Firm* — Maschoff Brennan

(57) ABSTRACT

A self-localization estimation device includes: a map-information acquisition unit that acquires map information including lane information for specifying lanes in which vehicles are enabled to travel; a position calculation unit that calculates an own-vehicle absolute position being an absolute position of an own vehicle in response to navigation signals received from a plurality of navigation satellites, the position calculation unit including a self-location measurement unit, a vehicle-momentum measurement unit, and dead reckoning unit; and a position estimation unit that estimates, based on the map information and the own-vehicle absolute position, a corrected own-vehicle position being a corrected position of the own vehicle. The position estimation unit estimates the corrected own-vehicle position by superimposing a reliability of the map information and a reliability of the own-vehicle absolute position on each other.

21 Claims, 25 Drawing Sheets

(51) Int. Cl.
  *G01S 19/48*  (2010.01)
  *G01C 21/34*  (2006.01)
  *G06T 7/73*  (2017.01)
  *G06T 7/70*  (2017.01)
  *G06V 10/75*  (2022.01)
  *G06V 20/56*  (2022.01)
(52) U.S. Cl.
  CPC .......... *G01C 21/3446* (2013.01); *G01S 19/48* (2013.01); *G06T 7/70* (2017.01); *G06T 7/74* (2017.01); *G06V 10/751* (2022.01); *G06V 20/588* (2022.01); *B60W 2520/14* (2013.01); *G06T 2207/30256* (2013.01)

(56) References Cited

U.S. PATENT DOCUMENTS

| | | | |
|---|---|---|---|
| 10,210,406 B2 * | 2/2019 | Huang | ................... G01C 21/32 |
| 2010/0324815 A1 | 12/2010 | Hiruta et al. | |
| 2011/0169958 A1 | 7/2011 | Imai et al. | |
| 2017/0097642 A1 | 4/2017 | Okuya et al. | |

FOREIGN PATENT DOCUMENTS

| | | | |
|---|---|---|---|
| JP | 2012-122760 A | 6/2012 | |
| JP | 2012-127845 A | 7/2012 | |
| JP | 2017-016226 A | 1/2017 | |
| JP | 2017-058235 A | 3/2017 | |

* cited by examiner

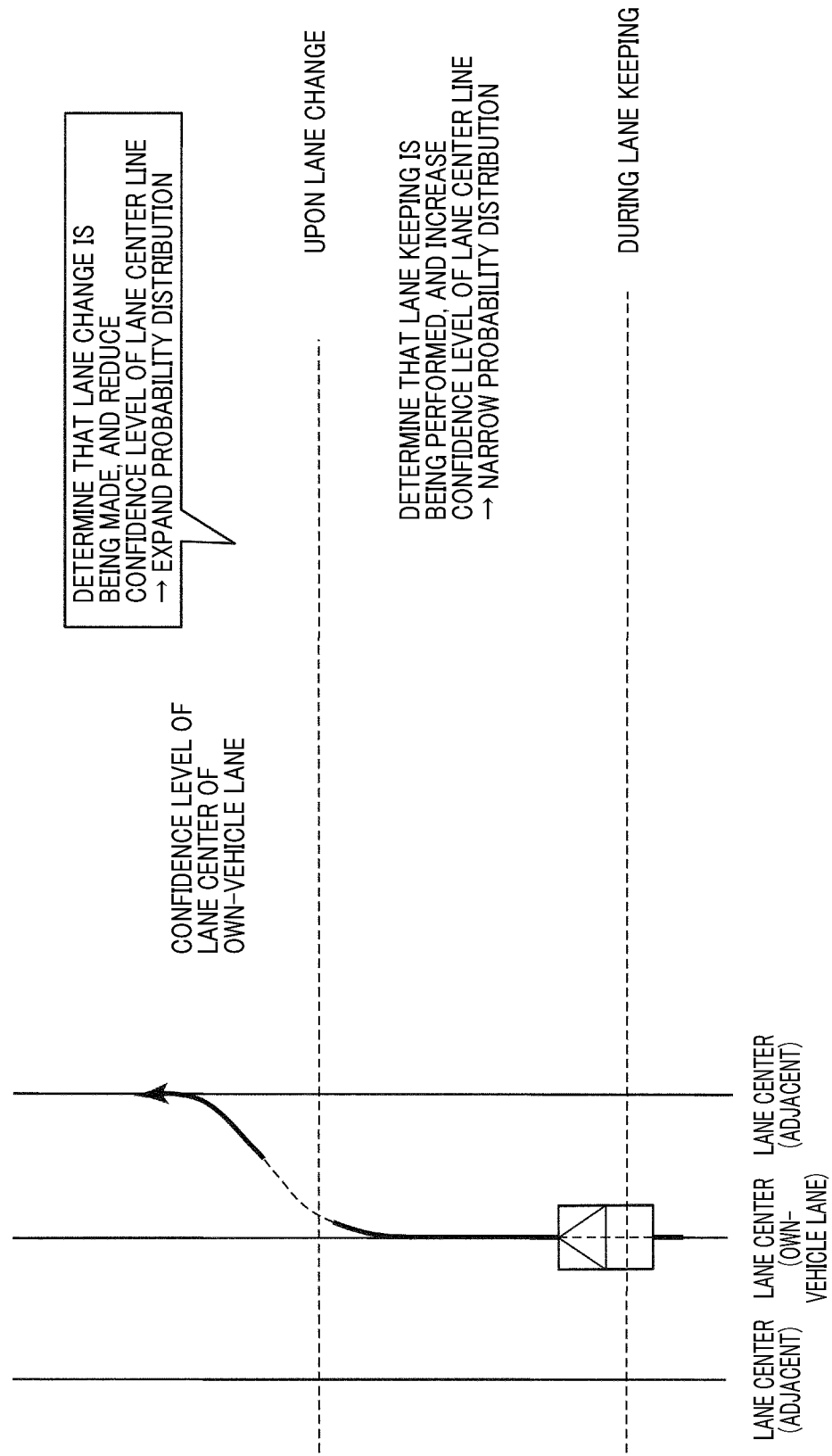

SUPPRESS VARIATION IN LATERAL POSITION
CORRECTION AMOUNT
OWN-VEHICLE POSITION    LANE CENTER

MAINTAIN VARIATION IN LATERAL POSITION
CORRECTION AMOUNT
OWN-VEHICLE POSITION
LANE CENTER

SELF-LOCALIZATION ESTIMATION DEVICE

CROSS REFERENCE TO RELATED APPLICATIONS

The present application is a continuation application of International Application No. PCT/JP2018/010057, filed on Mar. 14, 2018, which claims priorities to Japanese Patent Application No. 2017-051066 filed on Mar. 16, 2017, Japanese Patent Application No. 2017-248745 filed on Dec. 26, 2017, and Japanese Patent Application No. 2017-248744 filed on Dec. 26, 2017. The contents of these patent applications are incorporated herein by reference in their entirety.

BACKGROUND

Technical Field

The present disclosure relates to a self-localization estimation device.

Background Art

In a self-localization estimation device, an azimuth of a white line contained in images taken with use of a camera is calculated, and error estimation is performed by a Kalman filter based on a difference between an azimuth of a white line which is stored in an azimuth database, and the azimuth of the white line which is calculated from the images.

SUMMARY

According to the present disclosure, there is provided a self-localization estimation device including: a map-information acquisition unit that acquires map information; a position calculation unit that calculates an own-vehicle absolute position; and a position estimation unit. The position estimation unit estimates the corrected own-vehicle position by superimposing a reliability of the map information and a reliability of the own-vehicle absolute position on each other.

Figure 5:
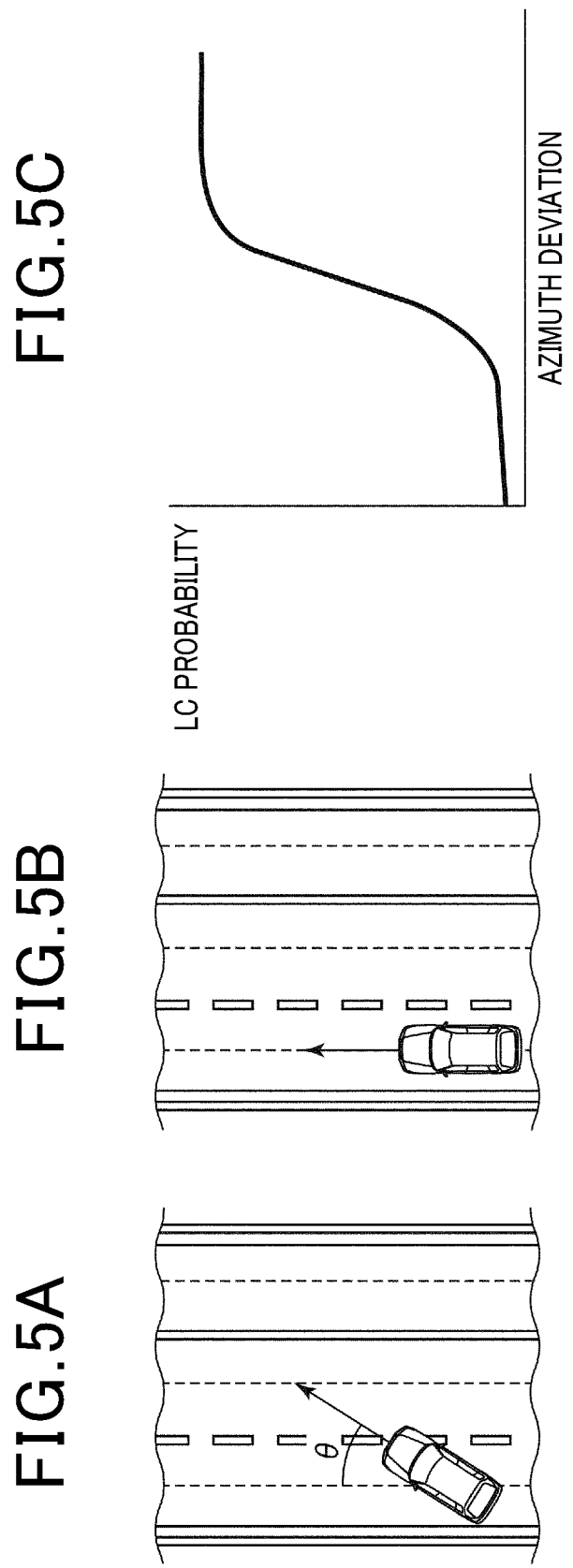

Each of FIGS. 5A and 5B is an explanatory chart showing a corresponding value of a lane-change probability in the embodiment.

FIG. 5C is a graph showing a relationship between an azimuth deviation and the lane-change probability in the embodiment.

Figure 6:
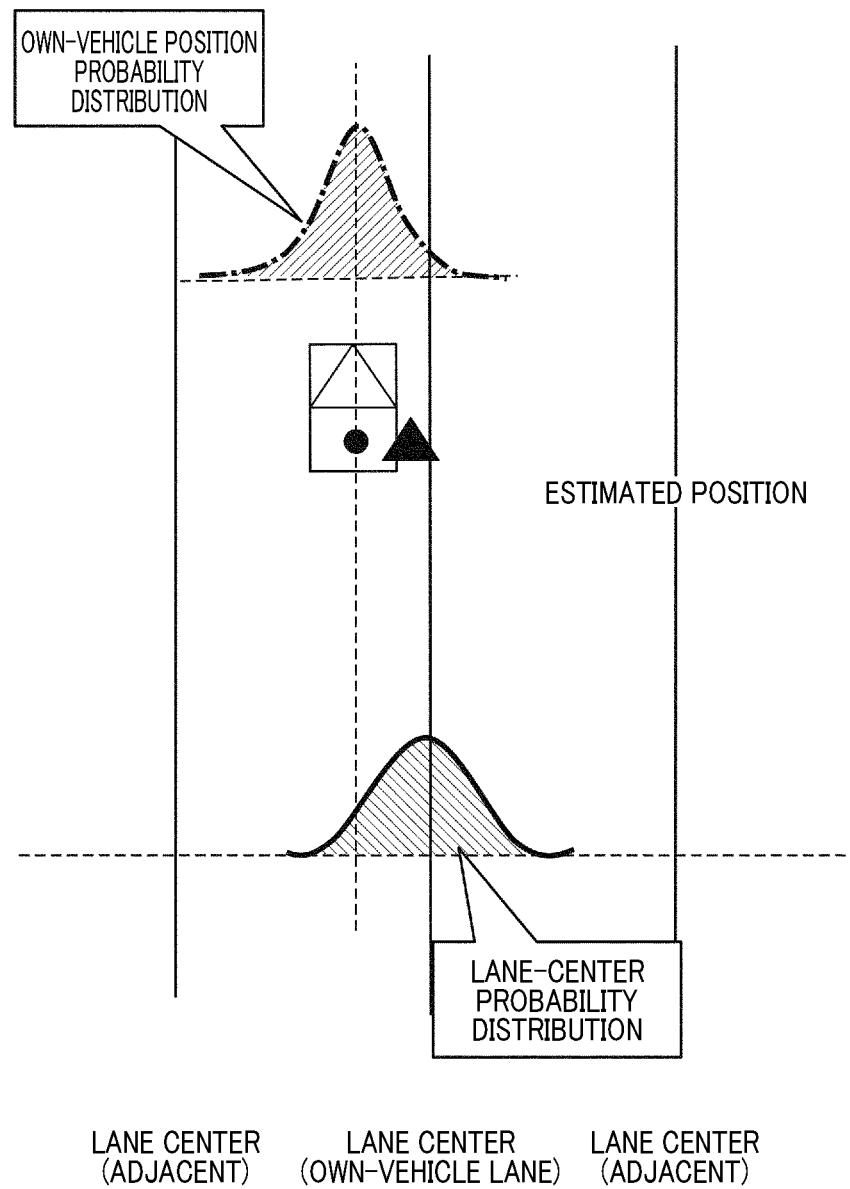

FIG. 6 is an explanatory chart showing a relationship between the lane-change probability and a confidence level of a lane center line in the embodiment.

FIG. 7 is an explanatory chart showing a relationship between an own-vehicle position probability distribution and a lane-center probability distribution in the embodiment.

Figure 8A:
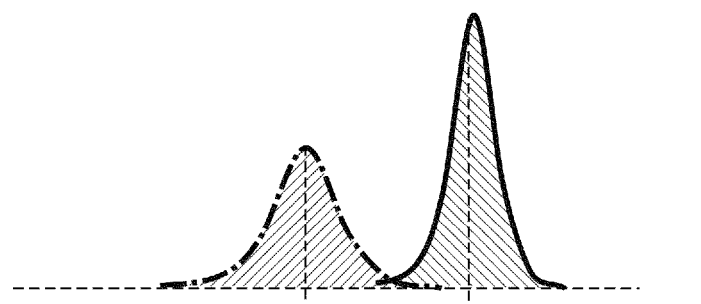
Figure 8B:
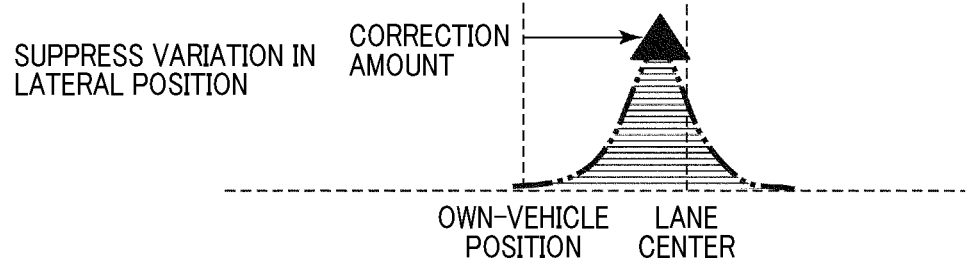

FIG. 8A and FIG. 8B are explanatory charts showing superimposition of the own-vehicle position probability distribution and the lane-center probability distribution when a value of the lane-change probability is low.

Figure 9A:
Figure 9B:
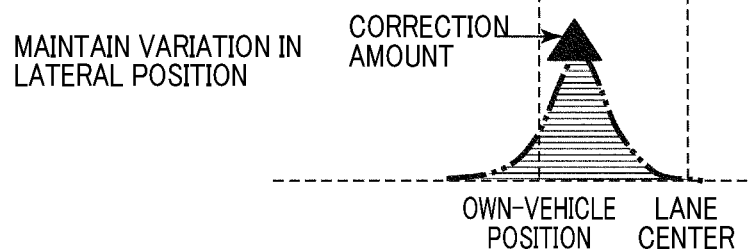

FIG. 9A and FIG. 9B are explanatory charts showing superimposition of the own-vehicle position probability distribution and the lane-center probability distribution map-information probability distribution when a value of the lane-change probability is high.

Figure 10A:
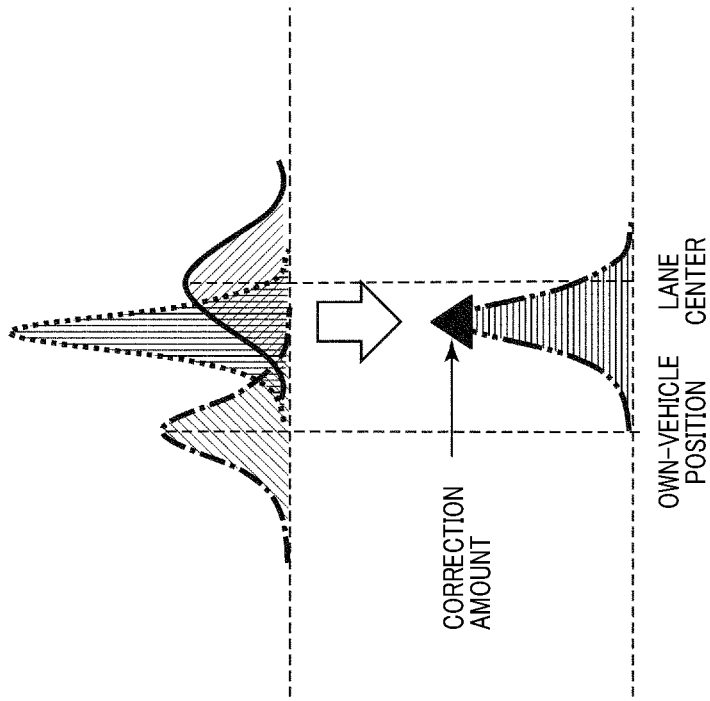
Figure 10B:
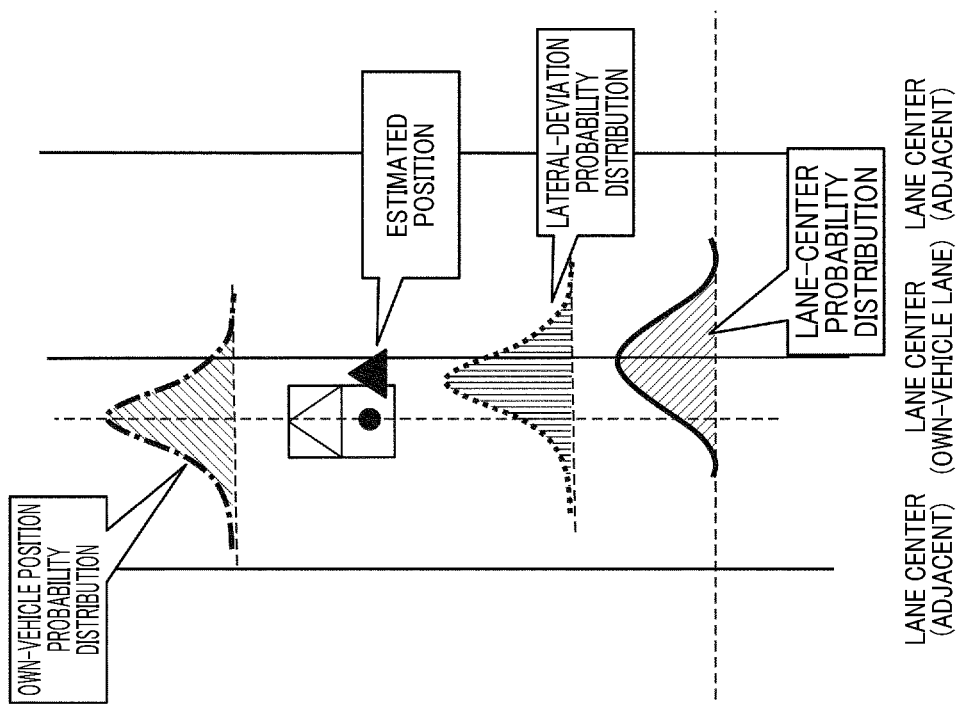

FIG. 10A and FIG. 10B are explanatory charts showing superimposition of the own-vehicle position probability distribution, the lane-center probability distribution, and a lateral-deviation probability distribution on one another.

Figure 11B:
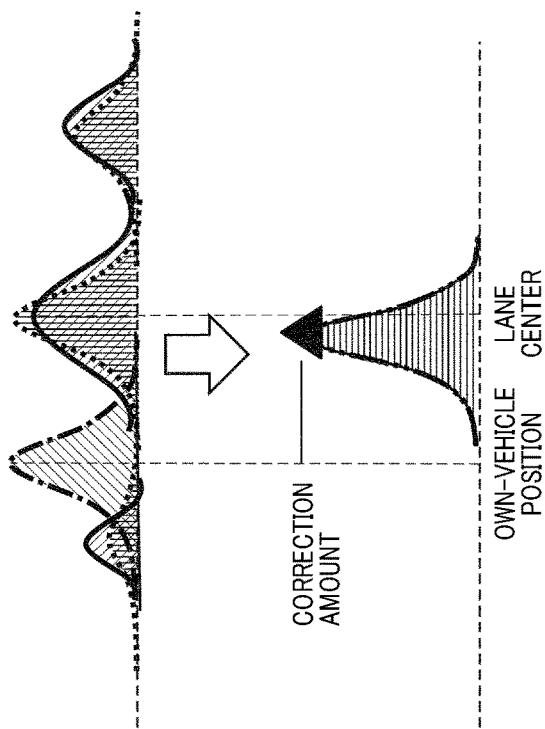
Figure 11A:
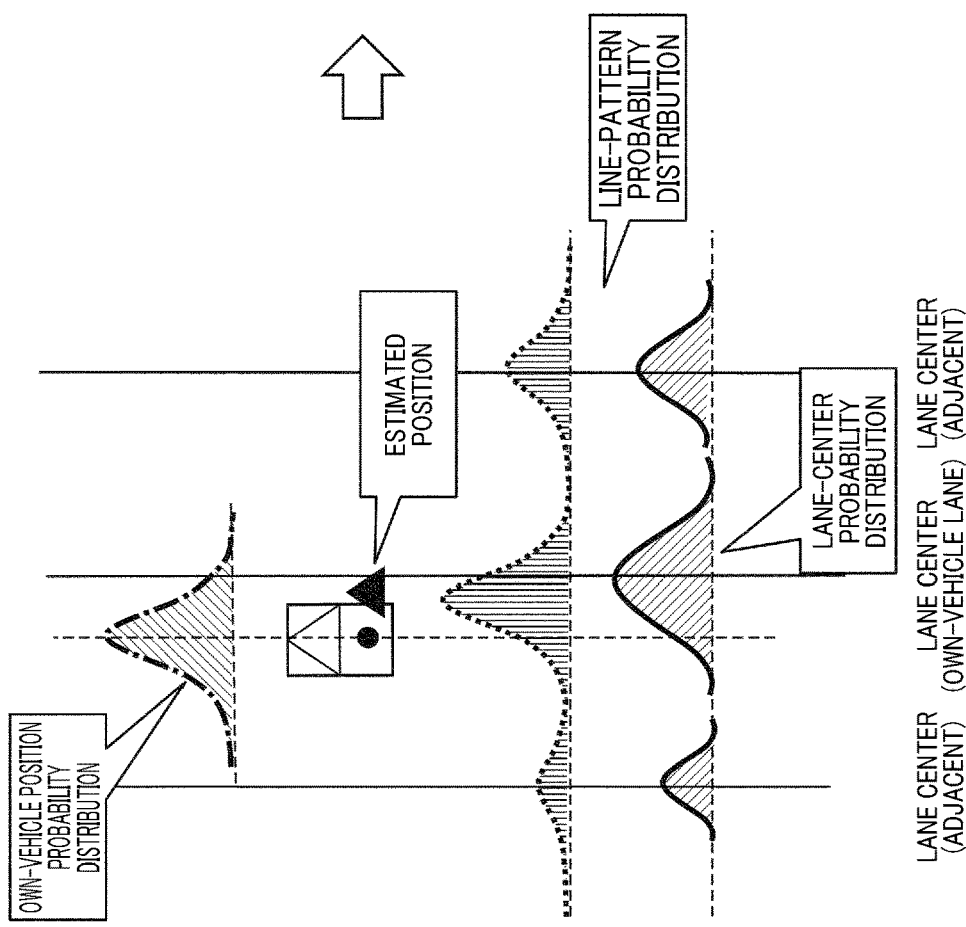

FIG. 11A and FIG. 11B are explanatory charts showing superimposition of the own-vehicle position probability distribution, the lane-center probability distribution, and a line-pattern probability distribution on one another.

Figure 12:
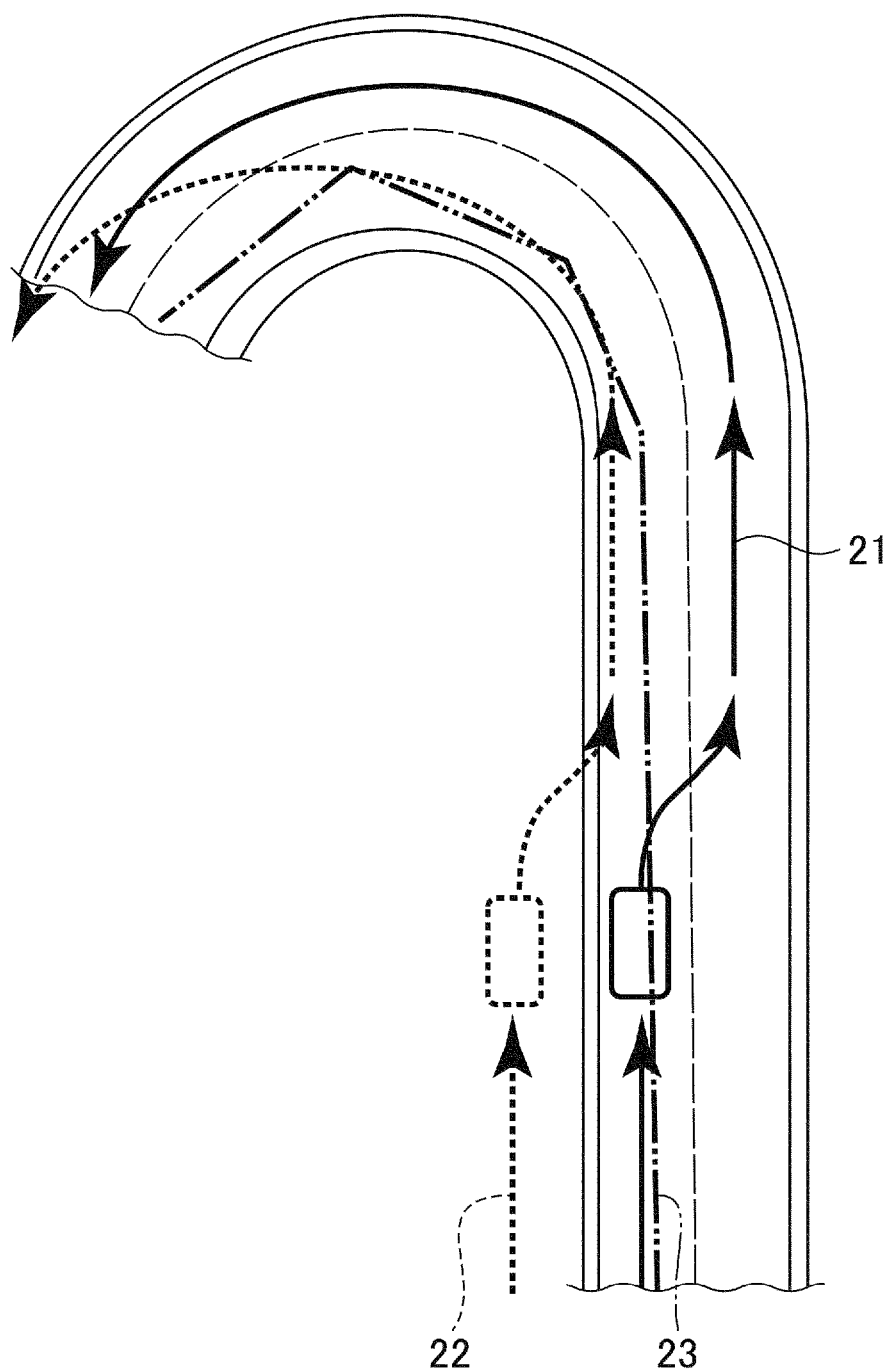

FIG. 12 is an explanatory chart showing displacement of an estimated position when the self-localization estimation according to the embodiment is not performed.

Figure 13:
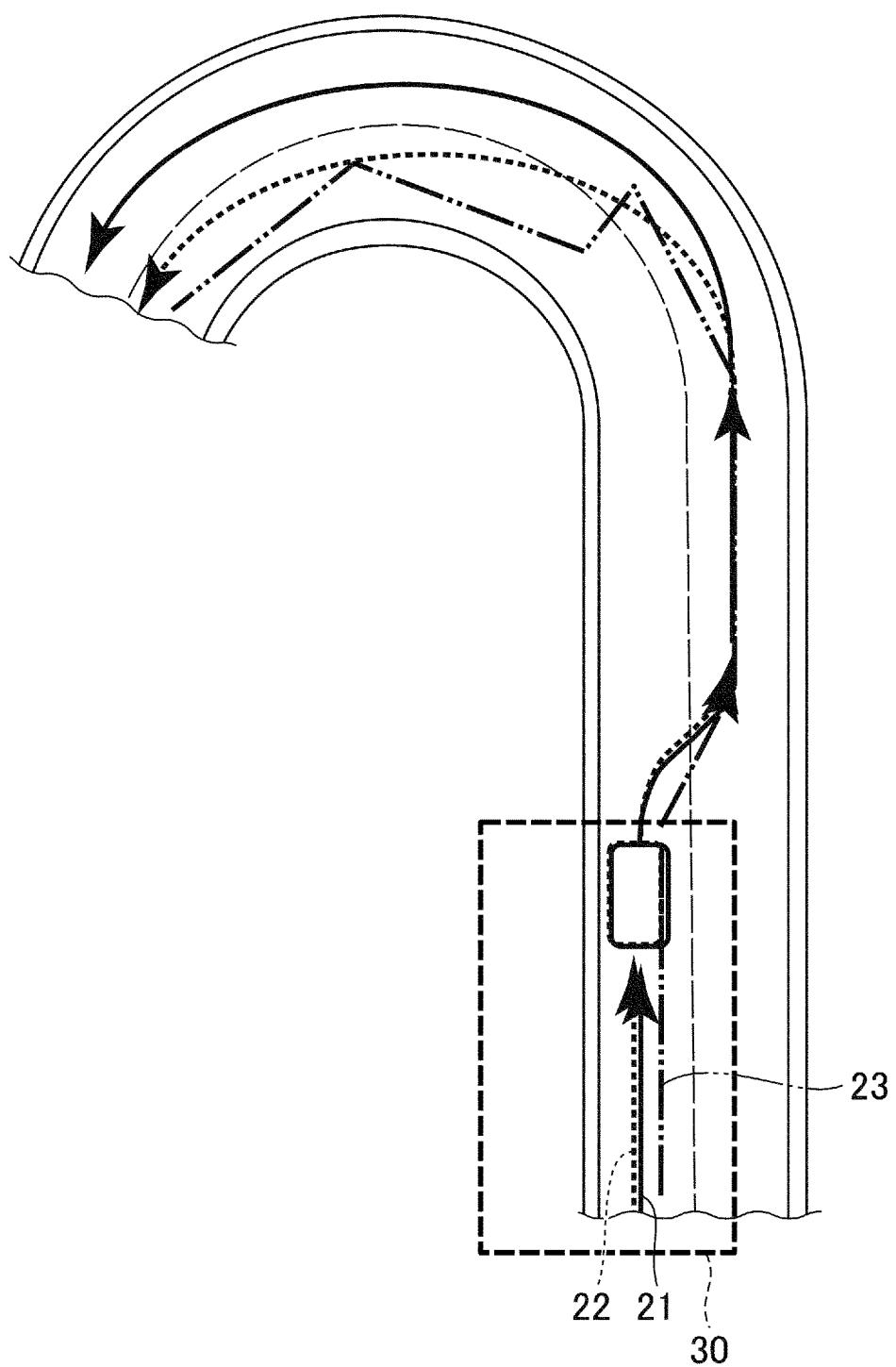

FIG. 13 is an explanatory chart showing an estimated position when the self-localization estimation according to the embodiment is performed.

Figure 14:
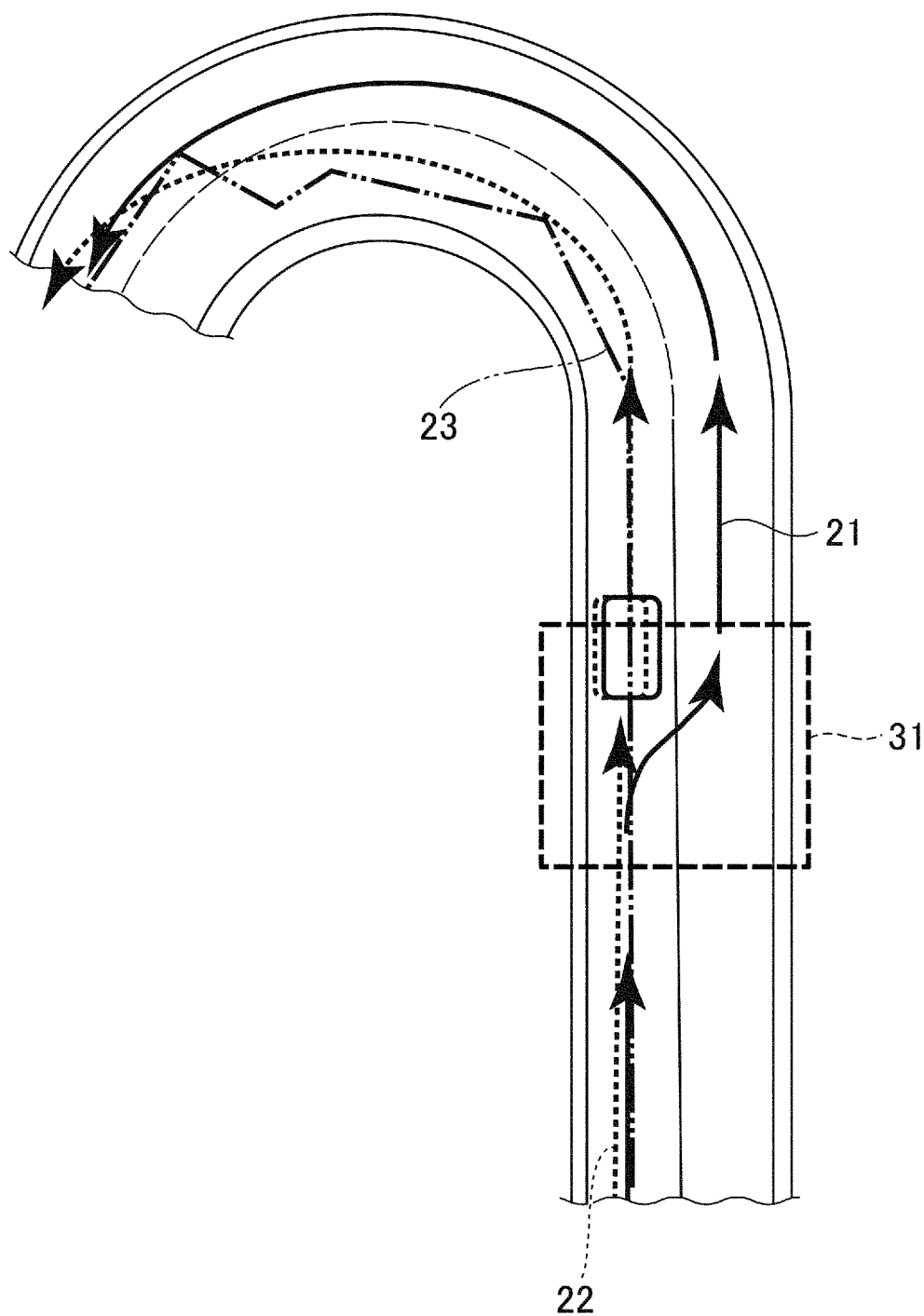

FIG. 14 is an explanatory chart showing displacement of an estimated position when the self-localization estimation according to the embodiment is not performed during lane change.

Figure 15:
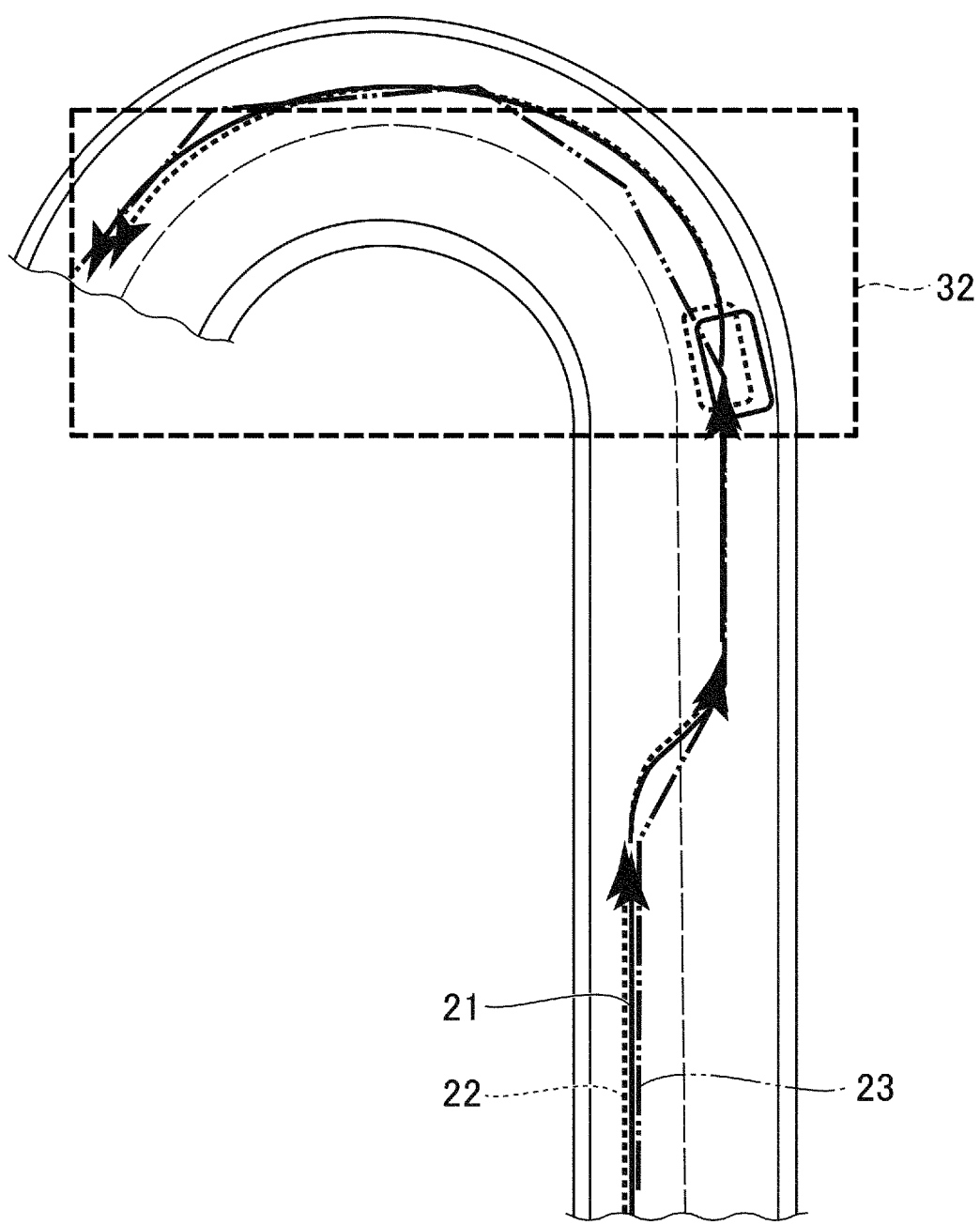

FIG. 15 is an explanatory chart showing displacement of an estimated position when the self-localization estimation according to the embodiment is performed during lane change.

Figure 16:
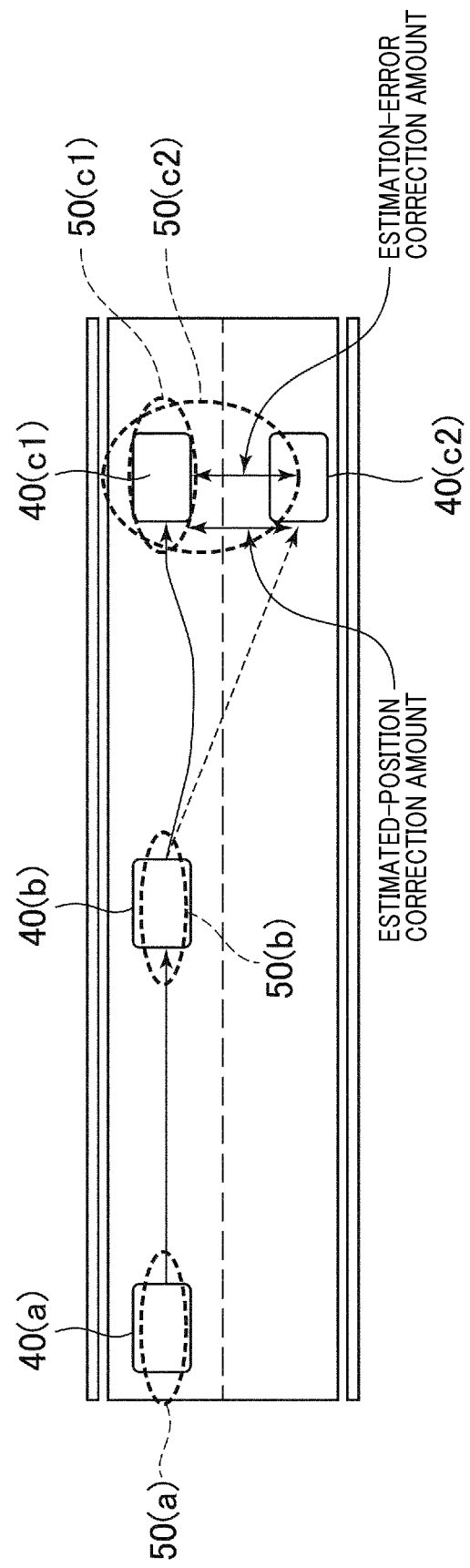

FIG. 16 is an explanatory chart showing a relationship between an estimated-position correction amount and an estimation-error correction amount according to the embodiment.

Figure 17:
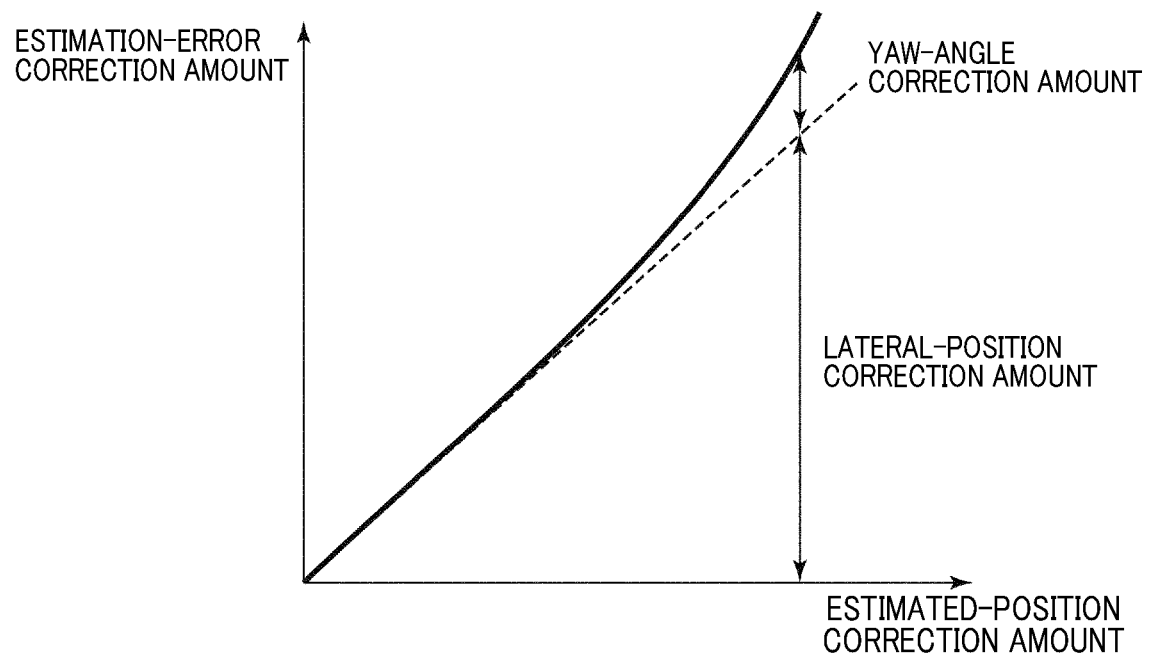

FIG. 17 is an explanatory graph showing a relationship between values of the estimated-position correction amount and corresponding values of the estimation-error correction amount according to the embodiment.

FIGS. 18A to 18D are diagrams for showing a first example of the relationship between an integration value of the correction amount and the number of own-vehicle-position candidates for initialization of the integration value of the correction amount.

FIGS. 19A to 19D are diagrams for showing a second example of the relationship between the integration value of the correction amount and the number of own-vehicle-position candidates for initialization of the integration value of the correction amount.

FIGS. 20A to 20D are diagrams for showing a third example of the relationship between the integration value of the correction amount and the number of own-vehicle-position candidates for initialization of the integration value of the correction amount.

FIGS. 21A to 21D are diagrams for showing a second example of confidence-level adjustment control.

FIGS. 22A to 22D are diagrams for showing a third example of the confidence-level adjustment control.

FIGS. 23A to 23D are diagrams for showing a fourth example of the confidence-level adjustment control.

Figure 23A:
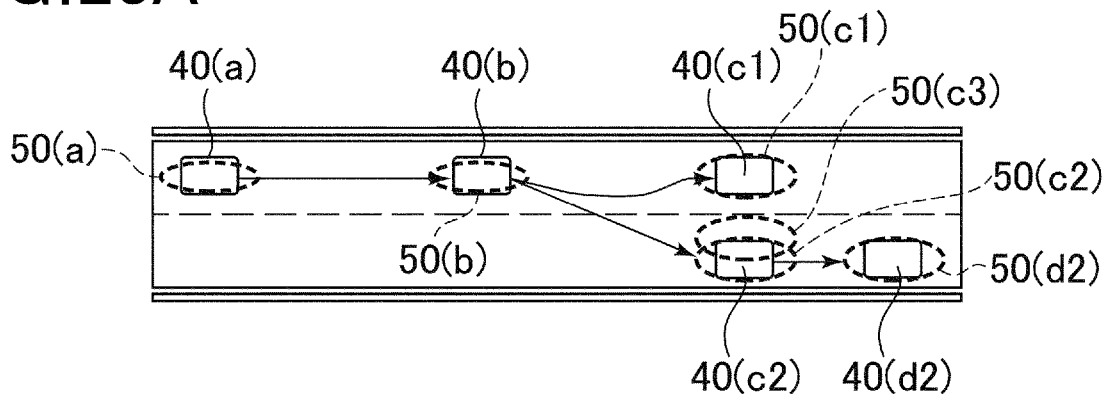
Figure 23B:
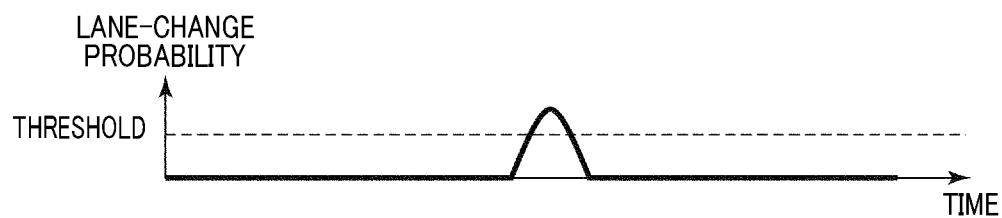
Figure 23C:
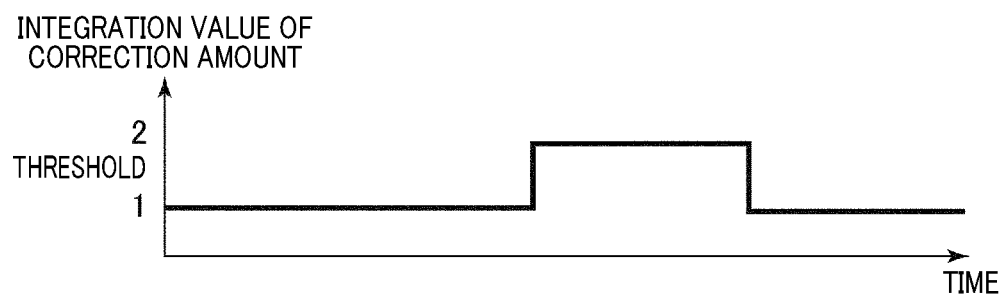
Figure 23D:
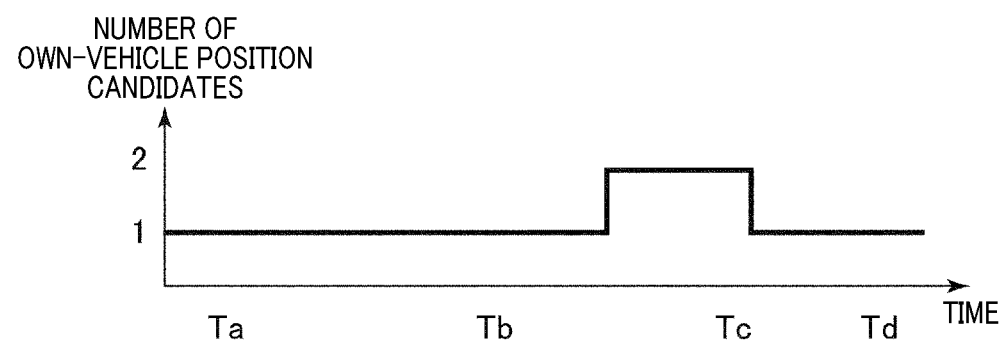
Figure 24:
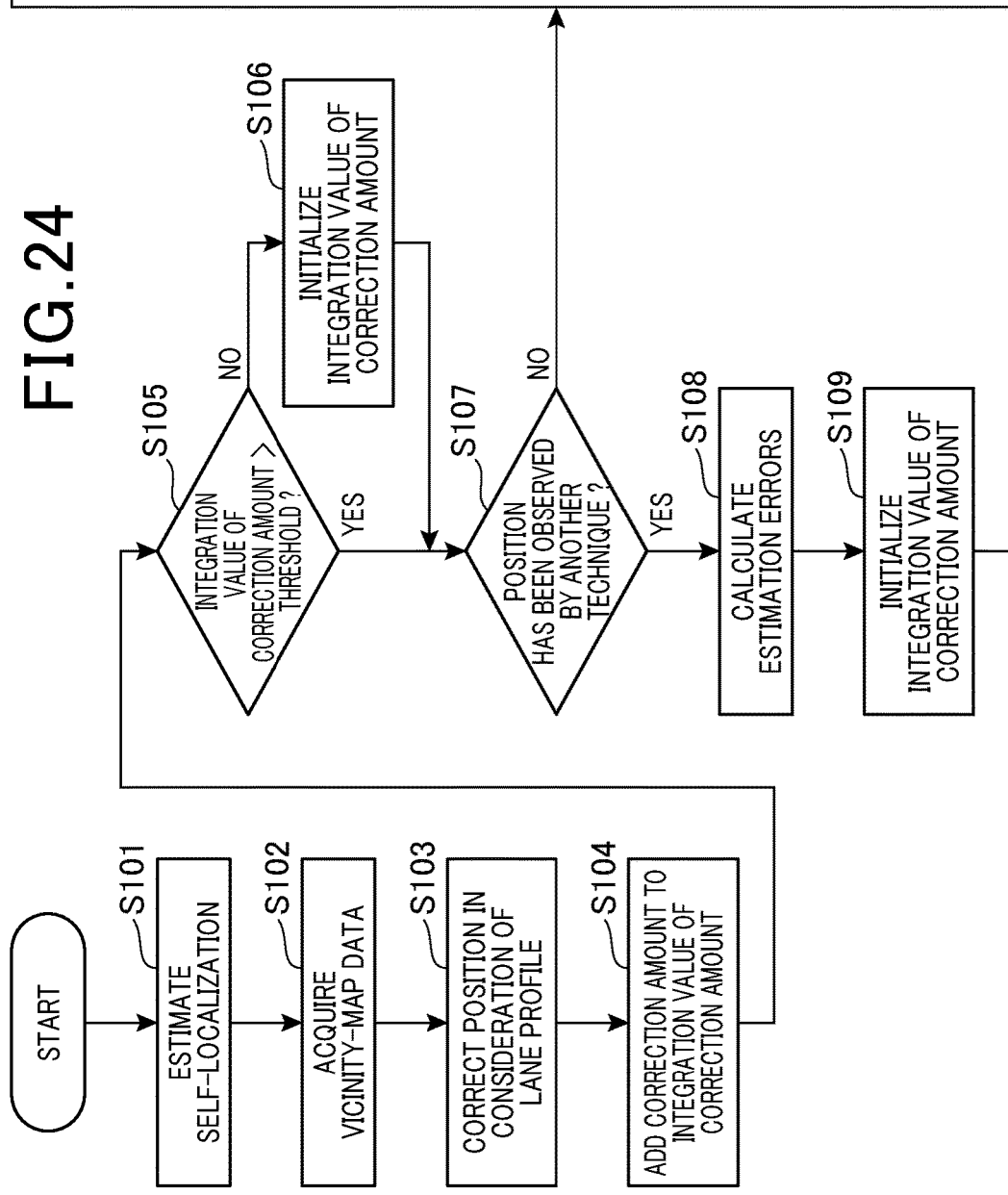

FIG. 24 is a flowchart showing a first routine carried out by the self-localization estimation device works in accordance with FIG. 16 to FIG. 23.

Figure 25:
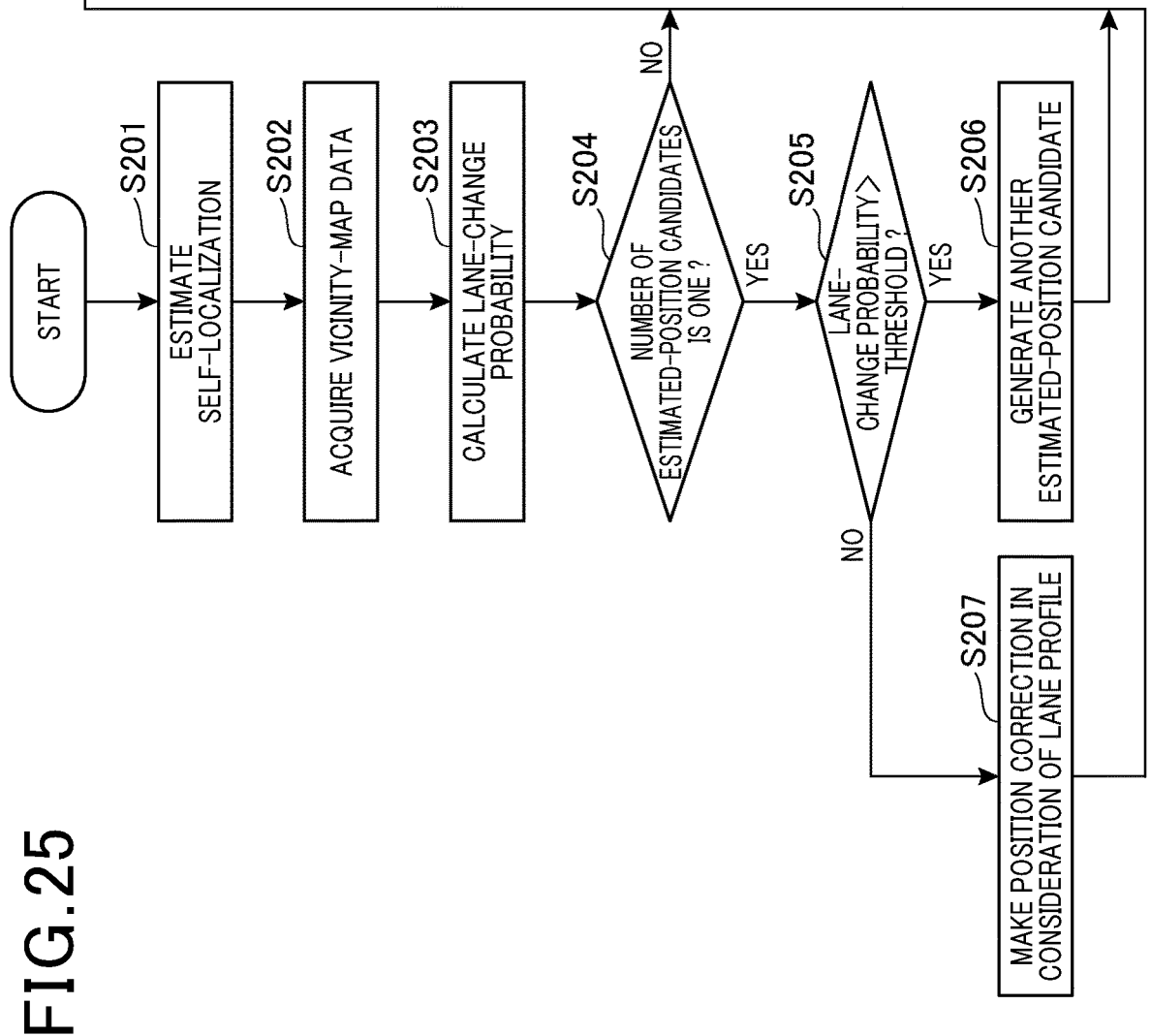

FIG. 25 is a flowchart showing a second routine carried out by the self-localization estimation device works in accordance with FIG. 16 to FIG. 23.

DETAILED DESCRIPTION OF THE PREFERRED EMBODIMENTS

The self-localization estimation device described in Patent Literature 1 cited below has been also known as a device for self-localization estimation of a vehicle. The self-localization estimation device described in Patent Literature 1 cited below is configured to execute, based on a Global Positioning System (GPS), an inertial device, and vehicle-speed pulses, calculation of the self-localization with the use of existing road infrastructure, such as on-load white lines and road signs, to thereby increase the self-localization of the vehicle.

[PTL 1] JP 2008-249639 A

In Patent Literature 1, since the above error estimation uses the images taken by the camera, the above error estimation cannot correctly estimate an error when the images cannot be clearly acquired as in case of bad weather. In particular, the necessity of lane-level estimation of the localization may cause the technology described in Patent Literature 1 to be unsuitable. In advanced driver assistance and autonomous driving, lane identification and in-lane localization are needed, and hence higher-accuracy self-localization estimation is required.

The present disclosure seeks to provide a self-localization estimation device capable of estimating lane-level localization with high accuracy.

According to the present disclosure, there is provided a self-localization estimation device including:

a map-information acquisition unit that acquires map information including lane information for specifying lanes in which vehicles are enabled to travel;

a position calculation unit that calculates an own-vehicle absolute position being an absolute position of an own vehicle; and a position estimation unit that estimates, based on the map information and the own-vehicle absolute position, a corrected own-vehicle position being a corrected position of the own vehicle, wherein:

the position estimation unit estimates the corrected own-vehicle position by superimposing a reliability of the map information and a reliability of the own-vehicle absolute position on each other.

According to the present disclosure, the reliability of the map information item and the reliability of the own-vehicle absolute position are superimposed on each other. Thus, the corrected own-vehicle positions can be estimated with accuracy higher than that at a time when only the own-vehicle absolute position is used.

Note that, "Summary" and "What is claimed is" are not limited by "Detailed Description of the Preferred Embodiments" described hereinbelow.

Now, an embodiment of the present disclosure is described with reference to the accompanying drawings. For the sake of ease of understanding the description, the same components in each of the drawings are denoted by the same reference symbols as much as possible to omit redundant description thereof.

Figure 1:
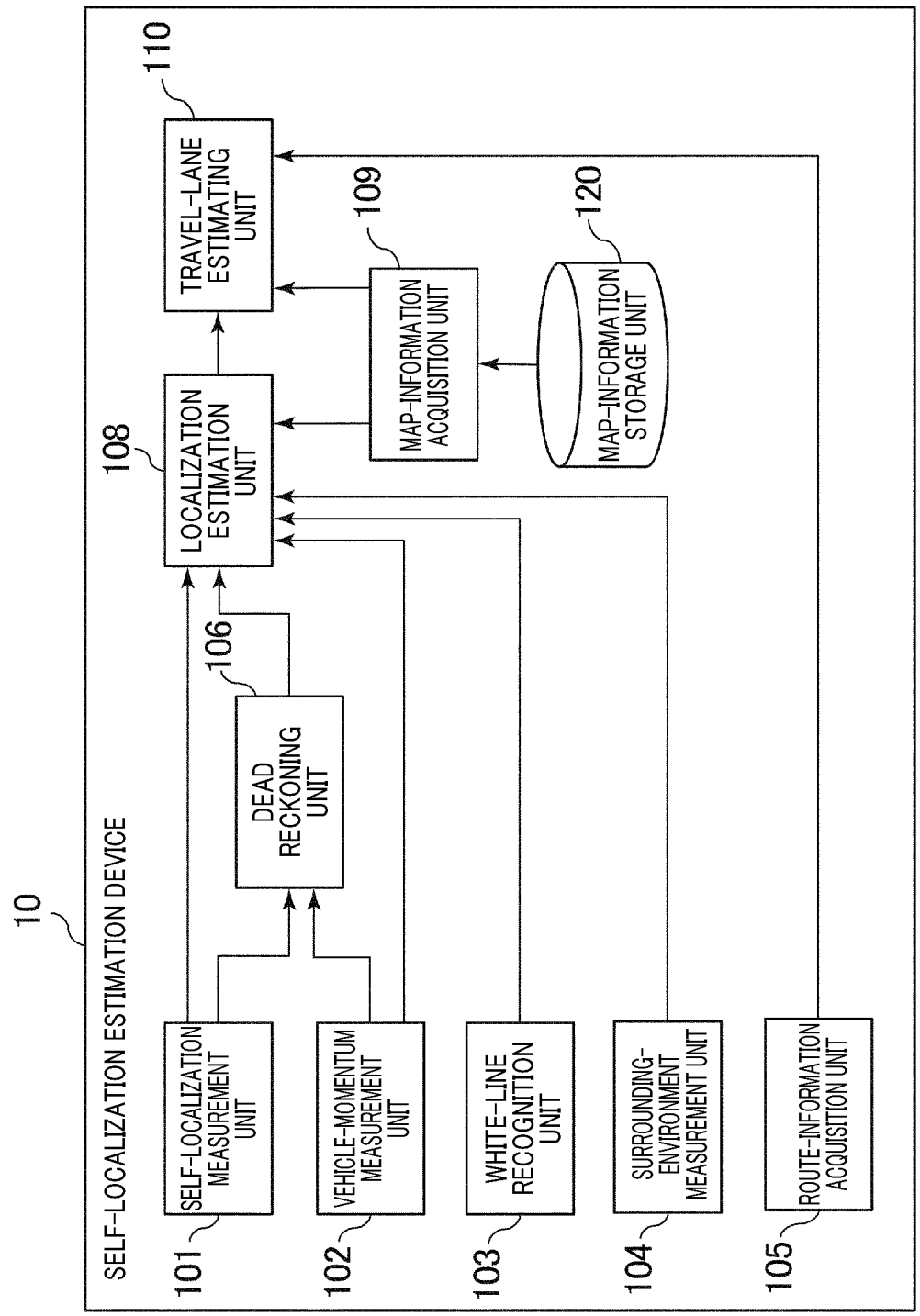
FIG. 1 is a block configuration diagram showing a functional configuration of a self-localization estimation device according to an embodiment.

With reference to FIG. 1, a self-localization estimation device 10 according to this embodiment is described. The self-localization estimation device 10 is configured as a computer that includes, as hardware components, computing units such as a CPU, storage units such as a RAM and a ROM, and interface units for exchanging data with various sensors. Now, functional components of the self-localization estimation device 10 are described.

The self-localization estimation device 10 includes a self-location measurement unit 101, a vehicle-momentum measurement unit 102, a white-line recognition unit 103, a surrounding-environment measurement unit 104, a route-information acquisition unit 105, a dead reckoning unit 106, a localization estimation unit, that is, a position estimation unit, 108, a map-information acquisition unit 109, a travel-lane estimation unit 110, and a map-information storage unit 120.

The self-location measurement unit 101 measures a location of an own vehicle by using a Global Navigation Satellite System (GNSS). The self-location measurement unit 101 calculates an own-vehicle measurement position being a navigation measurement position of the own vehicle in response to navigation signals that are received from a plurality of navigation satellites. The self-location measurement unit 101 outputs the calculated own-vehicle measurement position to the dead reckoning 106 and the localization estimation unit 108. The self-location measurement unit 101 constitutes a position calculation unit according to the present disclosure.

The vehicle-momentum measurement unit 102 measures a momentum of the own vehicle by receiving signals from the sensors such as an acceleration sensor, a vehicle-speed sensor, and a gyro sensor. The vehicle-momentum measurement unit 102 outputs information items about the momentum, which includes a vehicle speed, an azimuth, a yaw rate, and an acceleration of the own vehicle, to the dead reckoning 106 and the self-localization estimation unit 108. The vehicle-momentum measurement unit 102 constitutes the position calculation unit according to the present disclosure.

The white-line recognition unit 103 recognizes, by using data items of images taken by a camera, white lines that mark lanes. The white-line recognition unit 103 outputs, to the localization estimation unit 108, information items about whether the white lines are drawn, and information items about patterns of the white lines.

The surrounding-environment measurement unit 104 measures information items about weather and information items about a positional arrangement of the satellites. The surrounding-environment measurement unit 104 outputs, to the self-localization estimation unit 108, the information items about the weather, and the information items about the positional arrangement of the satellites.

The route-information acquisition unit 105 acquires, from a navigation system, a destination of the vehicle, and a route to the destination. The route-information acquisition unit 105 outputs, to the travel-lane estimation unit 110, information items indicating the destination and the route.

The dead reckoning unit 106 receives the own-vehicle measurement positions output from the self-localization measurement unit 101 and on the information items about the momentum, which are output from the vehicle-momentum measurement unit 102. Then, the dead reckoning unit 106 calculates, based on the own-vehicle measurement positions and the information items about the momentum, information indicative of positions of the own vehicle at respectively corresponding places where it is difficult to perform localization of the own vehicle with use only of the GNSS. The dead reckoning unit 106 outputs the calculated information to the localization estimation unit 108 as self-gyroscopic localization information.

The map-information acquisition unit 109 acquires a map information item including the lane information item for specifying lanes in which vehicles can travel. The map-information acquisition unit 109 reads the map information item stored in the map-information storage unit 120, and outputs the read map-information item to the localization estimation unit 108 and the travel-lane estimation unit 110.

The localization estimation unit 108 estimates, based on the map information item and the own-vehicle measurement position and/or the self-gyroscopic localization information, corrected own-vehicle positions, each of which is a corrected position of the own vehicle. The localization estimation unit 108 localizes each corrected own-vehicle position by superimposing a reliability of the corresponding map information item and a reliability of the corresponding own-vehicle measurement position and/or a reliability of the corresponding self-gyroscopic localization information on one another. Each of the reliability of the map information item and the reliability of an absolute position of the own vehicle may be represented by a corresponding probability distribution, or by a corresponding numerical value.

Figure 2:
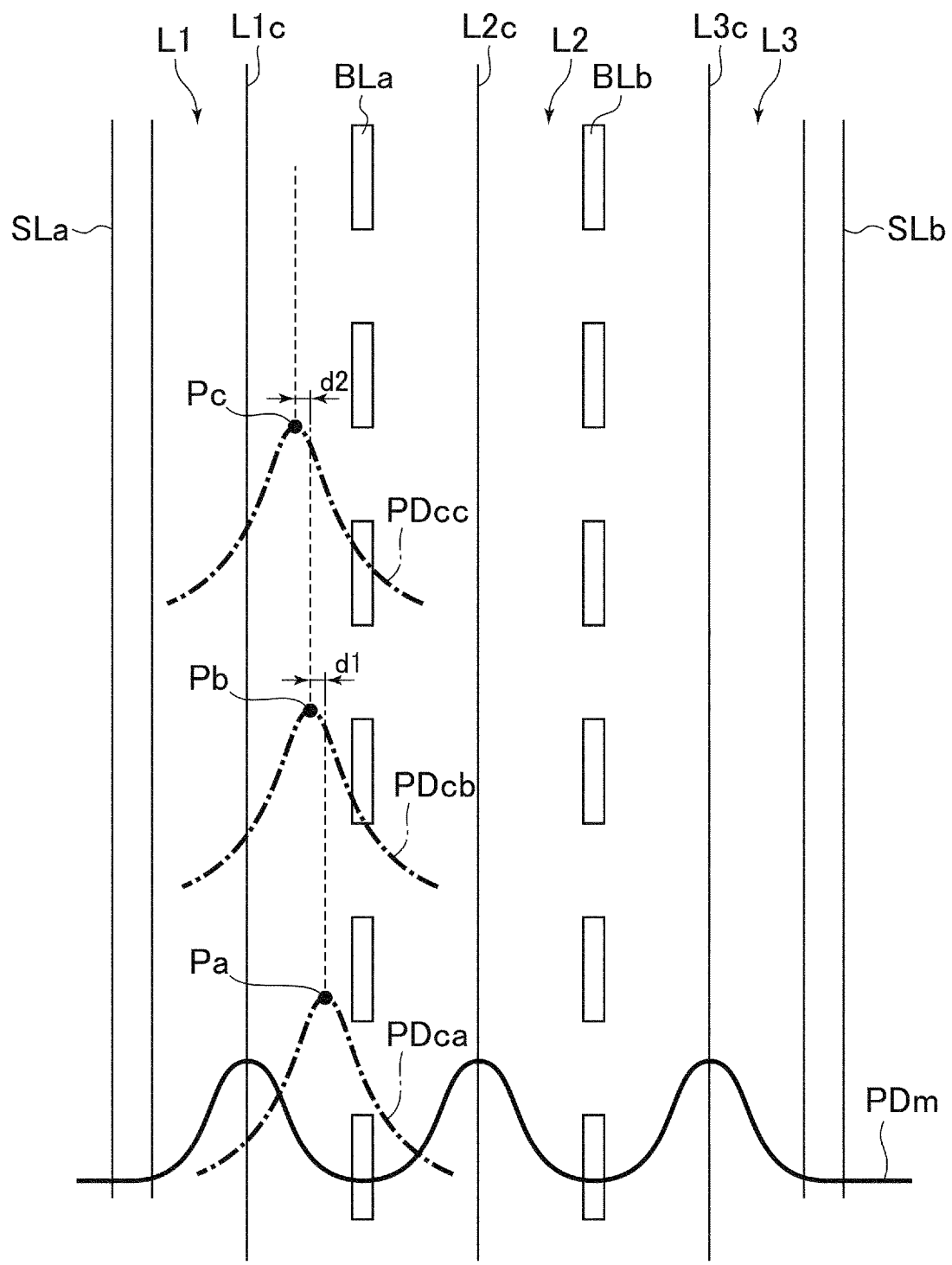
FIG. 2 is an explanatory chart showing a first example of a self-localization estimation in the embodiment.

With reference to FIG. 2, an example of a technique for localization of the corrected own-vehicle positions by the localization estimation unit 108 is described. In FIG. 2, three lanes L1, L2, and L3 are set. A solid white line SLa is drawn on the left in an advancing direction in the lane L1. A broken white line BLa is drawn between the lane L1 and the lane L2. A broken white line BLb is drawn between the lane L2 and the lane L3. A solid white line SLb is drawn on the right in the advancing direction in the lane L3. A lane center line L1c is a line indicating a center of the lane L1. A lane center line L2c is a line indicating a center of the lane L2. A lane center line L3c is a line indicating a center of the lane L3.

In an example shown in FIG. 2, a map-information probability distribution PDm of the lane center line L1c, the lane center line L2c, and the lane center line L3c is used to represent the reliability of the map information item. First, the own vehicle is positioned at an own-vehicle absolute position Pa. For the sake of convenience of description, the own vehicle is advancing from the own-vehicle absolute position Pa along the lane L1.

At a first estimation timing, the localization estimation unit 108 performs localization of a corrected own-vehicle position Pb by superimposing an own-vehicle position probability distribution PDca at the own-vehicle absolute position Pa on the map-information probability distribution PDm.

This enables the own-vehicle absolute position Pa before the localization at the first estimation timing to be corrected to the own-vehicle position Pb. The corrected own-vehicle position Pb is located to be closer to the lane center line L1c by a distance d1.

At a subsequent estimation timing, the localization unit 108 performs localization of a corrected own-vehicle position Pc by superimposing an own-vehicle position probability distribution PDcb at the corrected own-vehicle position Pb on the map-information probability distribution PDm. This enables the corrected own-vehicle position Pb before the localization at the subsequent timing to be corrected to the own-vehicle position Pc. The corrected own-vehicle position Pc is located to be closer to the lane center line L1c by a distance d2.

As the map-information probability distribution, not only the probability distribution of a lane center line, but also the probability distribution representing the reliability of the map information item is used. Further, a map-information probability distribution, which is offset relative to an original one in accordance with habits of drivers or a road profile, may be used. The road profile includes an information item about a road width, and an information item about presence/absence of an adjacent lane.

Figure 3:
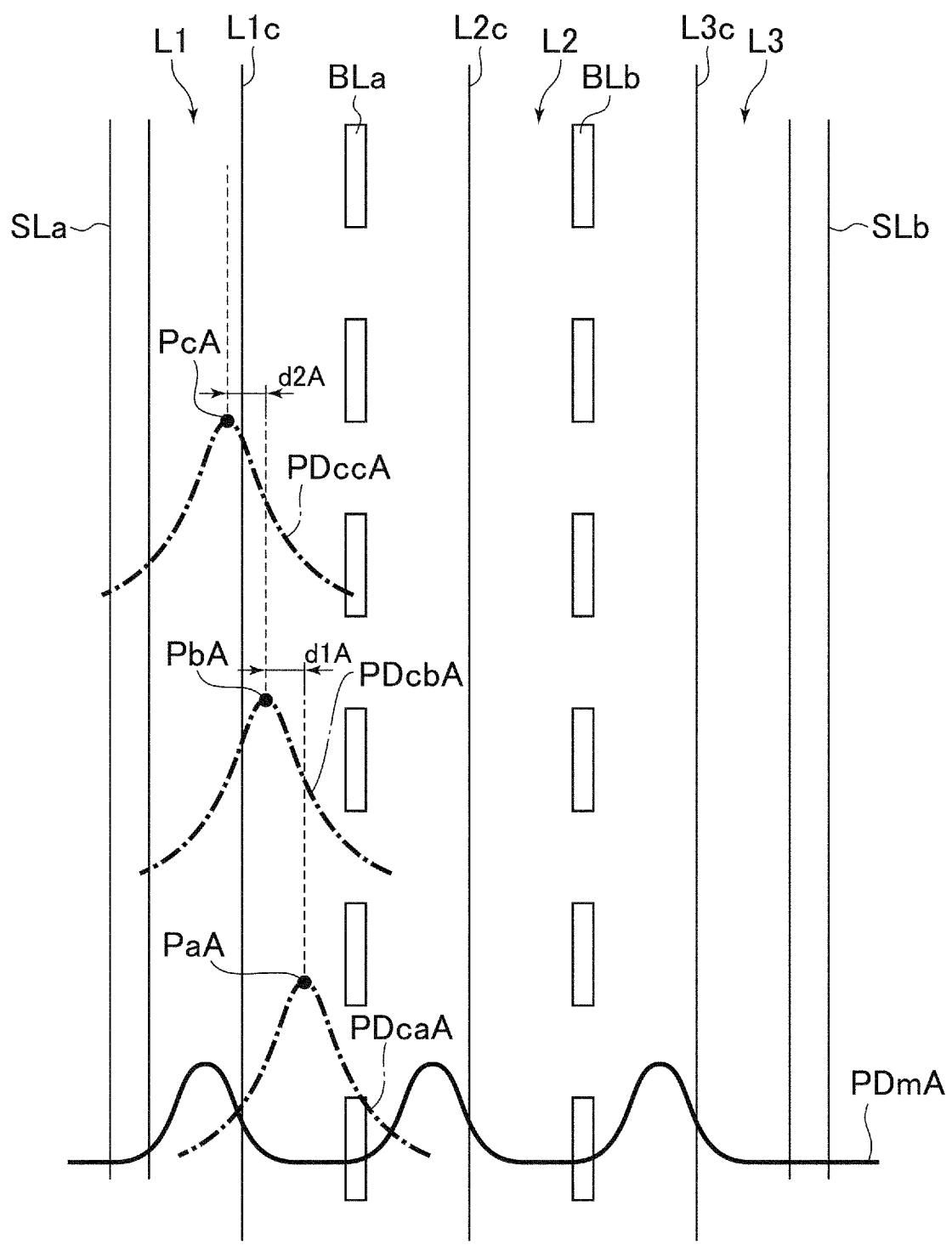
FIG. 3 is an explanatory chart showing a second example of the self-localization estimation in the embodiment.

In an example shown in FIG. 3, a map-information probability distribution PDmA of the lane center line L1c, the lane center line L2c, and the lane center line L3c, which is offset to the left in the travelling direction of the own vehicle relative to the map-information probability distribution PDm, is used to represent the reliability of the map information item.

At a first estimation timing, the localization estimation unit 108 performs localization of a corrected own-vehicle position PbA by superimposing an own-vehicle position probability distribution PDcaA at the own-vehicle absolute position PaA on the map-information probability distribution PDmA.

This enables the own-vehicle absolute position PaA before the localization at the first estimation timing to be corrected to the own-vehicle position PbA. The corrected own-vehicle position PbA is located to be closer to the lane center line L1c by a distance d1A.

At a subsequent estimation timing, the localization estimation unit 108 performs localization of a corrected own-vehicle position PcA by superimposing an own-vehicle position probability distribution PDcbA at the corrected own-vehicle position PbA on the map-information probability distribution PDmA. This enables the corrected own-vehicle position PbA before the localization at the subsequent timing to be corrected to the own-vehicle position PcA. The corrected own-vehicle position PcA is located to be closer to the lane center line L1c by a distance d2A.

The corrected own-vehicle positions according to the latter example described with reference to FIG. 3 are estimated to be closer to the left side of the lane L1 than those according to the former example described with reference to FIG. 2 where the map-information probability distribution PDm of the lane center line L1c, the lane center line L2c, and the lane center line L3c is used.

The localization 108 is capable of varying at least one of the reliability of the map information item and the reliability of the own-vehicle absolute position to change relative weights assigned to the respective map information item and own-vehicle absolute position, thereby estimating the corrected own-vehicle position.

Figure 4:
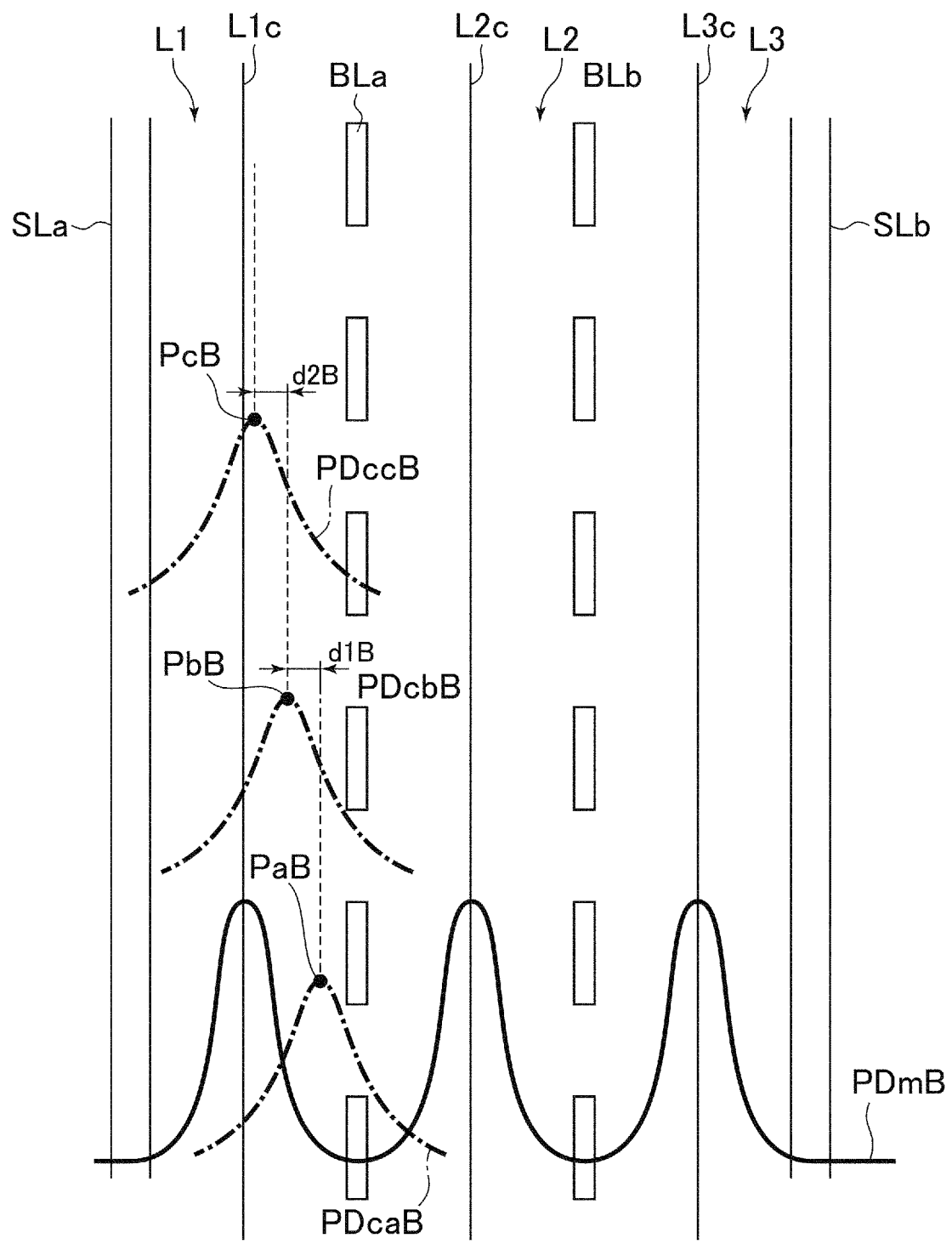
FIG. 4 is an explanatory chart showing a third example of the self-localization estimation in the embodiment.

In an example shown in FIG. 4, the weighs assigned to the respective map information item and own-vehicle absolute position are changed such that a reliability of a map-information probability distribution PDmB of the lane center line L1c, the lane center line L2c, and the lane center line L3c is relatively higher than reliabilities of respective own-vehicle position probability distributions PDcaB, PDcbB, and PDccB.

At a first estimation timing, the localization estimation unit 108 performs localization of a corrected own-vehicle position PbB by superimposing the own-vehicle position probability distribution PDcaB at the own-vehicle absolute position PaB on the map-information probability distribution PDmB.

This enables the own-vehicle absolute position PaB before the localization at the first estimation timing to be corrected to the own-vehicle position PbB. The corrected own-vehicle position PbB is located to be closer to the lane center line L1c by a distance d1B. The distance d1B is larger than the distance d1 shown in FIG. 2, and hence the corrected own-vehicle position PbB is closer to the lane center line L1c than the corrected own-vehicle position Pb is.

At a subsequent estimation timing, the localization estimation unit 108 performs localization of a corrected own-vehicle position PcB by superimposing an own-vehicle position probability distribution PDcbB at the corrected own-vehicle position PbB on the map-information probability distribution PDmB. This enables the corrected own-vehicle position PbB before the localization at the subsequent timing to be corrected to the own-vehicle position PcB. The corrected own-vehicle position PcB is located to be closer to the lane center line L1c by a distance d2B. The distance d2B is larger than the distance d2 shown in FIG. 2, and hence the corrected own-vehicle position PcB is closer to the lane center line L1c than the corrected own-vehicle position Pc is.

Increasing the reliability of the map-information probability distribution PDmB set forth above to raise the center of a peak of the map-information probability distribution PDmB enables correction of the own-vehicle position to be corrected while the own-vehicle position converging speed of the own-vehicle position to the lane center line L1c becomes faster.

Note that, when the own vehicle continues to travel in the lane L1 without making a lane change, the accuracy of localization, i.e. estimation, of the corrected own-vehicle positions, which is described with reference to FIG. 4, is high. However, the own vehicle may make a lane change, so that the accuracy of the corrected own-vehicle positions needs to be increased also at that time.

In view of such circumstances, the localization estimation unit 108 can be configured to vary the reliability of the map information item by using a lane-change probability (hereinafter, also referred to as "LC probability"). The LC probability represents a likelihood that the own vehicle moves from a lane in which the own vehicle is currently travelling to another lane.

More specifically, the localization estimation unit 108 can be configured to reduce the reliability of the map information item when the lane-change probability increases, and to increase the reliability of the map information item when the lane-change probability decreases.

The localization estimation unit 108 can be configured to calculate the lane-change probability based on a lane divergence amount; the lane divergence amount represents an amount of divergence of a travelling condition of the own vehicle with respect to how the lane in which the own vehicle is travelling extends. The localization estimation unit 108 can be configured to calculate the lane divergence amount based on at least one of 1. An azimuth deviation being a difference between an azimuth of the currently travelling lane and an azimuth of the travelling direction of the own vehicle 2. The yaw rate of the own vehicle 3. A yaw angle of the own vehicle 4. A steering angle of the own vehicle 5. Surrounding-environment information about a place where the own vehicle is travelling As shown in FIG. 5A, when an azimuth deviation θ being the difference between the azimuth of the lane direction and the azimuth of the travelling direction of the own vehicle has a predetermined value or higher, it is determined that the LC probability is high. Meanwhile, as shown in FIG. 5B, when the azimuth deviation θ being the difference between the azimuth of the lane direction and the azimuth of the advancing direction of the own vehicle has a predetermined value or lower or zero, it is determined that the LC probability is low. Generally, the azimuth deviation and the LC probability have a relationship as exemplified in FIG. 5C.

The localization estimation unit 108 estimates a corrected own-vehicle position based on the calculated lane-change probability, a lane information item, and an own-vehicle absolute position. The localization estimation unit 108 performs a correction to increase a contribution degree of the lane information item when the lane-change probability does not indicate a lane change of the own vehicle, and a correction to reduce the contribution degree of the lane information item when the lane-change probability indicates a lane change of the own vehicle.

Increasing the contribution degree of the lane information item when the lane-change probability does not indicate a lane change of the own vehicle enables correction of the own-vehicle absolute position based on the lane information item to estimate the corrected own-vehicle position to be close to the actual own-vehicle position even when the own-vehicle absolute position has shifted from the actual own-vehicle position.

In contrast, decreasing the contribution degree of the lane information item when the lane-change probability indicates a lane change of the own vehicle avoids, although a lane change has been actually performed, the own-vehicle position from being erroneously estimated to a wrong position where the own vehicle remains in a previous lane before the actual lane change.

As shown in FIG. 6, the localization estimation unit 108 calculates the own-vehicle absolute position as the own-vehicle position probability distribution. The localization estimation unit 108 calculates a lane center position in the lane information item as a lane-center probability distribution. The localization estimation unit 108 estimates the corrected own-vehicle position by superimposing the own-vehicle position probability distribution and the lane-center probability distribution on each other.

As shown in FIG. 7, the localization estimation unit 108 increases a confidence level of the lane-center probability distribution when the lane-change probability does not indicate a lane change of the own vehicle. When the lane-change probability indicates a lane change of the own vehicle, the localization estimation unit 108 reduces the confidence level of the lane-center probability distribution to thereby estimate a corrected own-vehicle position.

When the lane-change probability does not indicate a lane change of the own vehicle, the localization estimation unit 108 determines that the own vehicle is keeping in a current lane. Then, the localization estimation unit 108 increases a confidence level of the lane center line, that is, narrows the lane-center probability distribution. When the lane-change probability indicates a lane change of the own vehicle, the localization estimation unit 108 determines that the own vehicle is making a lane change. Then, the localization estimation unit 108 reduces the confidence level of the lane center line, that is, expands the lane-center probability distribution.

FIGS. 8A and 8B are explanatory charts showing superimposition of the probability distributions on each other while the own vehicle is keeping in a current lane.

As shown in FIG. 8A, the own-vehicle-position probability distribution and the lane-center probability distribution are respectively calculated. Since it is determined that the own vehicle is keeping in a current lane, the confidence level of the lane center line has been increased, and the lane-center probability distribution has been narrowed. As shown in FIG. 8B, superimposing the own-vehicle position probability distribution and the lane-center probability distribution on each other enables the probability distribution at a corrected own-vehicle position to be calculated. Since the confidence level of the lane center line has been increased, the corrected own-vehicle position has been corrected to be close to the lane center, making it possible to suppress variations in lateral position of the own vehicle.

FIGS. 9A and 9B are explanatory charts showing superimposition of the probability distributions while the own vehicle is making a lane change. As shown in FIG. 9A, both the own-vehicle-position probability distribution and the lane-center probability distribution are calculated. Since it is determined that the own vehicle is making a lane change, the confidence level of the lane center line has been reduced, and the lane-center probability distribution has been expanded. As shown in FIG. 9B, superimposing the own-vehicle-position probability distribution and the lane-center probability distribution on each other enables the probability distribution at a corrected own-vehicle position to be calculated. Since the confidence level of the lane center line has been reduced, the corrected own-vehicle position has been corrected to be close to the own-vehicle position, making it possible to maintain change of the lateral position of the own vehicle.

An idea of calculating a corrected own-vehicle position by such superimposition of the probability distributions is applicable to reflecting other factors on the corrected own-vehicle position.

FIGS. 10A and 10B show an example of reflecting a lateral-deviation probability distribution on the corrected own-vehicle position.

As shown in FIG. 10A, in addition to the own-vehicle-position probability distribution and the lane-center probability distribution, the lateral-deviation probability distribution is calculated. The lateral-deviation probability distribution is a probability distribution indicating that, based on a result of the recognition of the white lines by the white-line recognition unit 103, which of the lanes the own vehicle tends to be located links with its probability.

As shown in FIG. 10B, by additionally superimposing the lateral-deviation probability distribution on the own-vehicle-position probability distribution and the lane-center probability distribution, a corrected own-vehicle position and a correction amount in consideration of the lateral deviation can be calculated.

FIGS. 11A and 11B show an example of an example of reflecting a line-pattern probability distribution on the corrected own-vehicle position.

As shown in FIG. 11A, in addition to the own-vehicle position probability distribution and the lane-center probability distribution, the line-pattern probability distribution is calculated. The line-pattern probability distribution is a probability distribution for example indicating that, based on a result of the recognition of the white lines by the white-line recognition unit 103, which of a continuous line and a broken line of each white line is marked on the lane links with its probability.

As shown in FIG. 11B, by additionally superimposing the line-pattern probability distribution on the own-vehicle-position probability distribution and the lane-center probability distribution, a corrected own-vehicle position and a correction amount in consideration of the line pattern of each white line can be calculated.

The localization estimation unit 108 estimates the corrected own-vehicle position and outputs the corrected own-vehicle position to the travel-lane estimation unit 110. The travel-lane estimation unit 110 estimates, based on the own-vehicle absolute position or the corrected own-vehicle position, a travel lane being the lane in which the own vehicle is travelling, the travel lane being included in the map information item.

With reference to FIG. 12 to FIG. 15, the estimation of a corrected own-vehicle position by the localization estimation unit 108, and the estimation of a travel lane by the travel-lane estimation unit 110, are described.

In FIG. 12 to FIG. 15, an actual travel line 21 being a solid line indicates an actual travelling condition. A measurement line 22 being a broken line indicates a track of the own-vehicle absolute position, which is measured by the self-localization measurement unit 101 and the dead reckoning unit 106. A two-dot chain line indicates an estimated travel lane 23.

FIG. 12 shows an exemplary case where the localization estimation unit 108 estimates no corrected own-vehicle positions. As indicated by the actual travel line 21, after travelling in a lane on the left, the own vehicle has made a lane change to a lane on the right. However, errors of displacement to the left as a whole have occurred to the measurement line 22, and hence the estimated travel lane 23 is deviated from the actual travel line 21, resulting in the travel-lane estimation unit 110 erroneously estimating that the own vehicle is travelling in the lane on the left without making a lane change.

FIG. 13 shows an exemplary case where the localization estimation unit 108 estimates corrected own-vehicle positions. In a region 30, the own vehicle is travelling in the lane on the left without making a lane change. Thus, the measurement line 22 has been corrected and arranged to be closer to a center of the lane. The travel-lane estimation unit 110 therefore estimates that the own vehicle is travelling in the lane on the left in the region 30.

FIG. 14 shows an exemplary case where the localization estimation unit 108 estimates no corrected own-vehicle positions during a lane change. In a region 31, the own vehicle is travelling in the lane on the right after making a lane change from the lane on the left to the lane on the right.

In contrast, FIG. 15 shows an exemplary case where the localization estimation unit 108 estimates corrected own-vehicle positions during a lane change. Reflecting the lane change in the region 31 shown in FIG. 14 on the corrected own-vehicle positions enables the measurement line 22 to be corrected and arranged to be closer to a center of the lane on the left. This correction is continued even along a curve of the lane. Thus, the travel-lane estimation unit 110 estimates that the own vehicle is travelling in the lane on the right in a region 32.

Now, correspondences between the above-described embodiment and the present disclosure are described. The self-localization measurement unit 101, the vehicle-momentum measurement unit 102, and the dead reckoning unit 106 of this embodiment serve as the position calculation unit of the present disclosure.

As described hereinabove, the self-localization estimation device 10 according to this embodiment includes the map-information acquisition unit 109, self-location measurement unit 101, vehicle-momentum measurement unit 102, dead reckoning unit 106, and localization estimation unit 108; these components 101, 102, and 106 serve as a position calculation unit.

The map-information acquisition unit 109 acquires a map information item including a lane information item for specifying lanes in which vehicles can travel.

The self-localization measurement unit 101 calculates an own-vehicle absolute position being an absolute position of the own vehicle in accordance with navigation signals received from a plurality of navigation satellites.

The localization estimation unit 108 estimates, based on the map information item and the own-vehicle absolute position, a corrected own-vehicle position being a corrected position of the own vehicle.

Specifically, the localization estimation unit 108 estimates the corrected own-vehicle position by superimposing the reliability of the map information item and the reliability of the own-vehicle absolute position on each other. Since the reliability of the map information item and the reliability of the own-vehicle absolute position are superimposed on each other, the corrected own-vehicle position can be estimated with accuracy higher than that estimated when only the own-vehicle absolute position is used.

Further, in this embodiment, the localization estimation unit 108 is capable of 1. Varying at least one of the reliability of the map information item and the reliability of the own-vehicle absolute position to change relative weights assigned to the respective map information item and own-vehicle absolute position 2. Estimating the corrected own-vehicle position based on the map information and the own-vehicle absolute position respectively having the changed relative weights Changing the relative weights assigned to the respective map information item and own-vehicle absolute position enables an increase in an impact of more reliable one of the map information item and own-vehicle absolute position, resulting in an increase in the accuracy in position estimation.

Still further, in this embodiment, the localization estimation unit 108 is capable of varying the reliability of the map information item by using the lane-change probability; the lane-change probability is a probability indicating a likelihood that the own vehicle moves from a lane in which the own vehicle is currently travelling to another lane.

More specifically, the localization estimation unit 108 is capable of maintaining or reducing the reliability of the map information item when the lane-change probability increases, and of increasing the reliability of the map information item when the lane-change probability decreases.

Increasing the reliability of the map information item when the own vehicle does not make a lane change enables positions of the own vehicle to be estimated along an actual lane.

Meanwhile, maintaining or decreasing the reliability of the map information item when the own vehicle makes a lane change enables excessive influence of the map information item on estimation of the own-vehicle positions to be eliminated, making it possible to estimate the own-vehicle positions on which the lane change is reflected. Reflecting the lane-change probability on the estimation of the corrected own-vehicle positions makes it possible to 1. Reduce a possibility of erroneous determination that the own vehicle has made a lane change to an adjacent lane although the own vehicle is keeping in a current lane 2. Reduce a possibility of erroneous determination that the own vehicle has not made a lane change although the own vehicle has actually made a lane change The localization estimation unit 108 is capable of calculating the lane-change probability based on the lane divergence amount being the amount of the divergence of the travelling condition of the own vehicle with respect to information about how the lane in which the own vehicle is travelling extends. More specifically, the localization estimation unit 108 is capable of calculating the lane divergence amount based on at least one of 1. An azimuth deviation being a difference between an azimuth of the currently travelling lane and an azimuth of the travelling direction of the own vehicle 2. The yaw rate of the own vehicle 3. A yaw angle of the own vehicle 4. A steering angle of the own vehicle 5. Surrounding-environment information about a place where the own vehicle is travelling The localization estimation unit 108 is capable of 1. Representing the reliability of the map information item as the map-information probability distribution, and the reliability of the own-vehicle absolute position as the own-vehicle position probability distribution 2. Estimating a corrected own-vehicle position by superimposing the map-information probability distribution and the own-vehicle position probability distribution on each other The map-information probability distribution includes a probability distribution of a lane in which the vehicle is travelling or the lane center position.

The localization estimation unit 108 is capable of obtaining the line-pattern information item acquired by the camera, and reflecting the line-pattern information item on the estimation of the corrected own-vehicle positions. The localization estimation unit 108 is also capable of obtaining the surrounding-environment information item acquired by the camera, and reflecting the surrounding-environment information item on the estimation of the corrected own-vehicle positions.

The localization estimation unit 108 is capable of reflecting turn-signal information on the estimation of the corrected own-vehicle positions. For example, when a right-hand turn signal is turned on, the own vehicle is likely to make a lane change to the lane on the right. Thus, the lane-change probability can be increased.

The localization estimation unit 108 is also capable of reflecting conditions of a driver on the estimation of the corrected own-vehicle positions. The localization estimation unit 108 is also capable of reflecting operations by a driver on the estimation of the corrected own-vehicle positions. Reflecting the conditions of and the operations by a driver enablers the likelihood of the lane change to be estimated with higher accuracy.

The localization estimation unit 108 in this embodiment is capable of performing confidence-level adjustment control to reduce a confidence level of each corrected own-vehicle position in accordance with a corresponding correction amount by which the own-vehicle absolute position is corrected to the corresponding corrected own-vehicle position.

When the correction amount increases, divergence between the own-vehicle absolute position and the corrected own-vehicle position increases. When a position close to an uncorrected own-vehicle absolute position is a real own-vehicle position, there is a possibility that the real own-vehicle position is not fall within a predetermined confidence level around the corrected own-vehicle position.

Form this viewpoint, reducing the confidence level of the corrected own-vehicle position in accordance with the correction amount enables a likelihood that the real own-vehicle position is within the predetermined confidence level around the corrected own-vehicle position to be increased.

The localization estimation unit 108 in this embodiment is capable of reducing the confidence level of a present corrected own-vehicle position in accordance with a correction-amount integrated value that is the sum of the previously used correction amounts.

Use of the correction-amount integrated value enables continuous own-vehicle absolute positions to be sequentially corrected to the respective corrected own-vehicle positions. Even if a divergence between a corrected own-vehicle position and a corresponding own-vehicle absolute position increases while the continuous correction is performed, reducing the confidence level of the corrected own-vehicle position in accordance with the correction-amount integrated value enables the likelihood that the real own-vehicle position is within the predetermined confidence level around the corrected own-vehicle position to be increased.

The following describes a first example of the above confidence-level adjustment control with reference to FIG. 16. FIG. 16 shows own-vehicle absolute positions 40(*a*) and 40(*b*) and confidence levels 50(*a*) and 50(*b*) corresponding thereto, respectively. The own vehicle reaches the own-vehicle absolute position 40(*b*) after lapse of a predetermined time from the own-vehicle absolute position 40(*a*).

As an own-vehicle absolute position after lapse of a next predetermined time period, the self-localization measurement unit 101, the vehicle-momentum measurement unit 102, and the dead reckoning unit 106, which serve as a position calculation unit, calculate an own-vehicle absolute position 40(*c*2). The localization estimation unit 108 calculates a corrected own-vehicle position 40(*c*1) as the corrected own-vehicle position.

An estimated-position correction amount at a time when the own-vehicle absolute position 40(*c*2) is corrected to the corrected own-vehicle position 40(*c*1) is large. Thus, confidence-level adjustment control is performed such that an estimation-error correction amount also increases in accordance with the estimated-position correction amount. FIG. 17 shows an example of a relationship between the estimated-position correction amount and the estimation-error correction amount.

As shown in FIG. 17, when the estimated-position correction amount increases, a lateral-position correction amount and a yaw-angle correction amount also increase. Therefore, the estimation-error correction amount is set to increase with an increase of the estimated-position correction amount.

In FIG. 16, the corrected own-vehicle position 40(*c*1), which would have a range of a confidence level 50(*c*1) if no confidence-level adjustment control were performed, has expanded to a range of a confidence level 50(*c*2) based on execution of the confidence-level adjustment control.

The localization estimation unit 108 in this embodiment is capable of initializing the correction-amount integrated value when the correction-amount integrated value does not exceed an integration threshold that is set in accordance with a predetermined elapsed time period. When the correction-amount integrated value does not exceed the integration threshold within the predetermined elapsed time period, initializing the correction-amount integrated value enables accumulation of errors in a lateral direction to be suppressed.

Figure 18A:
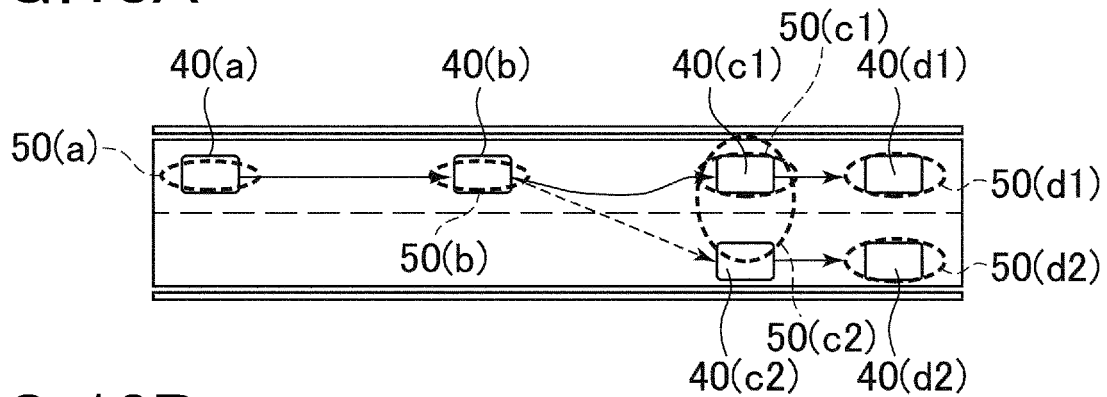
Figure 18B:
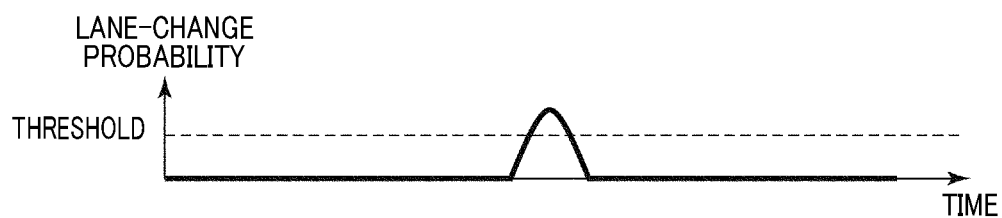
Figure 18C:
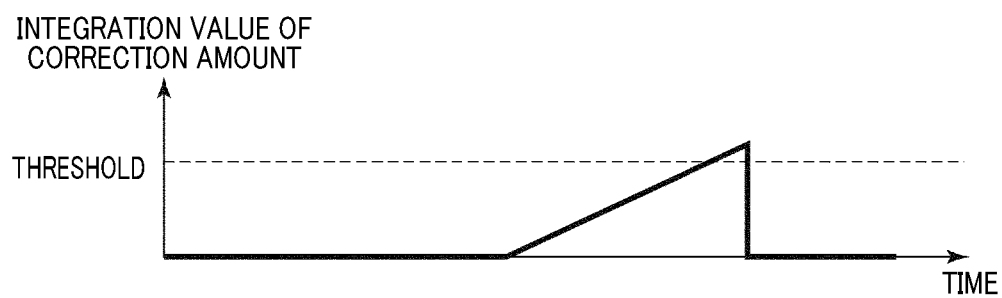
Figure 18D:
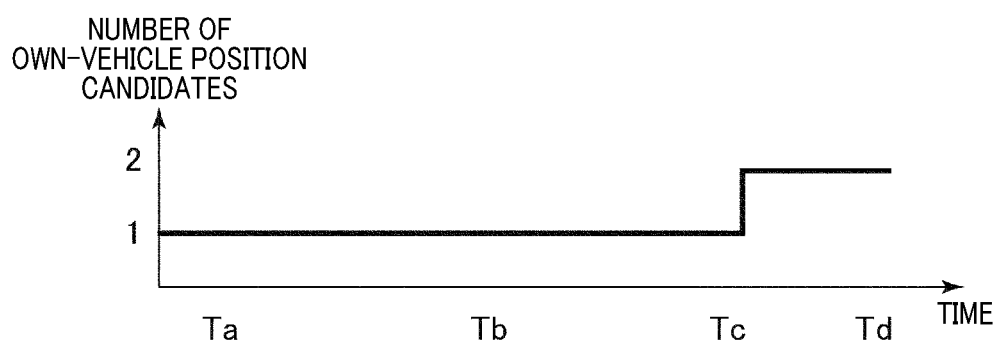

The following describes a first example of initialization of the correction-amount integrated value with reference to FIGS. 18A to 18D. FIG. 18A shows a transition of the position of the own vehicle and a transition of the confidence level. FIG. 18B shows a transition of the lane-change probability. FIG. 18C shows a transition of the correction-amount integrated value. FIG. 18D shows a transition of the number of own-vehicle position candidates.

FIG. 18A shows the own-vehicle absolute positions 40(*a*) and 40(*b*) and the confidence levels 50(*a*) and 50(*b*) corresponding thereto, respectively. The own vehicle reaches the own-vehicle absolute position 40(*b*) at a time point Tb after lapse of a predetermined time from the own-vehicle absolute position 40(*a*) corresponding to a time point Ta.

As an own-vehicle absolute position at a time point Tc after lapse of a next predetermined time period, the self-localization measurement unit 101, the vehicle-momentum measurement unit 102, and the dead reckoning unit 106, which serve as the position calculation unit, calculate the own-vehicle absolute position 40(*c*2). The localization estimation unit 108 calculates the corrected own-vehicle position 40(*c*1) as the corrected own-vehicle position.

Correcting the own-vehicle absolute position 40(*c*2) to the corrected own-vehicle position 40(*c*1) results in the estimated-position correction amount being larger. Thus, the confidence-level adjustment control is performed such that the estimation-error correction amount also increases in accordance with an increase of the estimation-position correction amount. Executing the confidence-level adjustment control, which is similar to that described with reference to FIG. 16 and FIG. 17, enables the confidence level 50(*c*1) to expand to the confidence level 50(*c*2).

At the time point Tc, the correction-amount integrated value exceeds the integration threshold due to the estimation-error correction amount having increased. At that time, the localization estimation unit 108 initializes the correction-amount integrated value, and generates two candidates of the corrected own-vehicle position. At a time point Td, the localization estimation unit 108 generates a corrected own-vehicle position 40(*d*1) and a confidence level 50(*d*1) corresponding thereto, and a corrected own-vehicle position 40(*d*2) and a confidence level 50(*d*2) corresponding thereto in an adjacent lane.

Figure 19A:
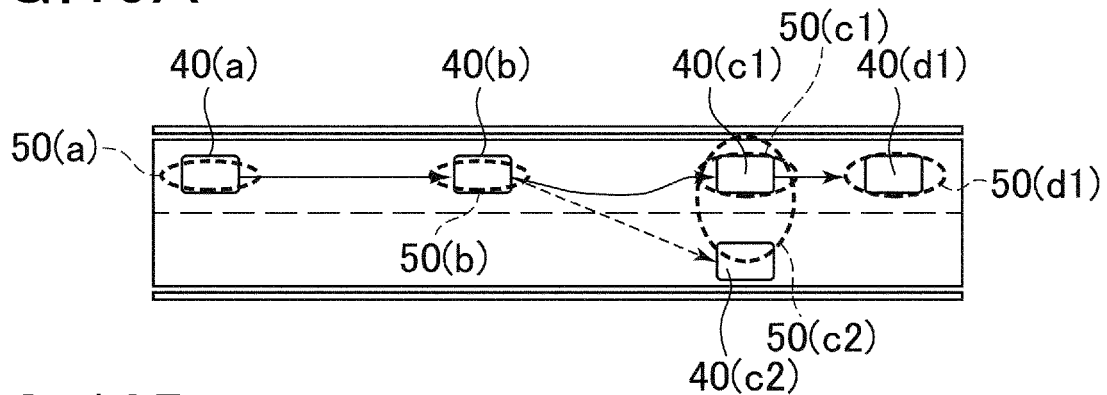
Figure 19B:
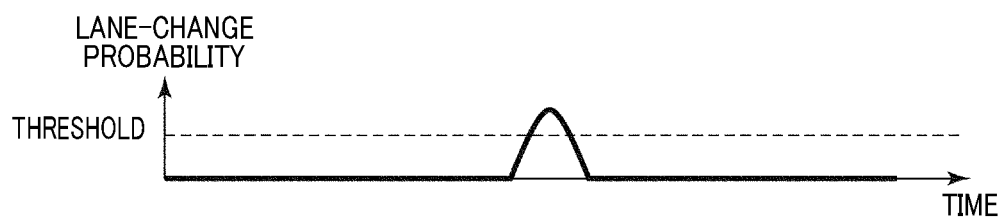
Figure 19C:
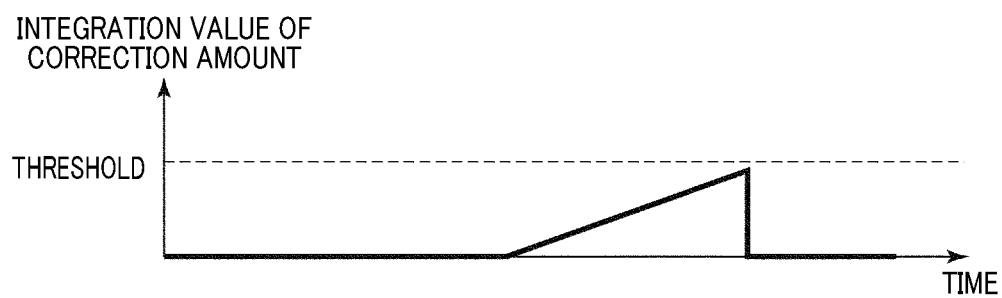
Figure 19D:
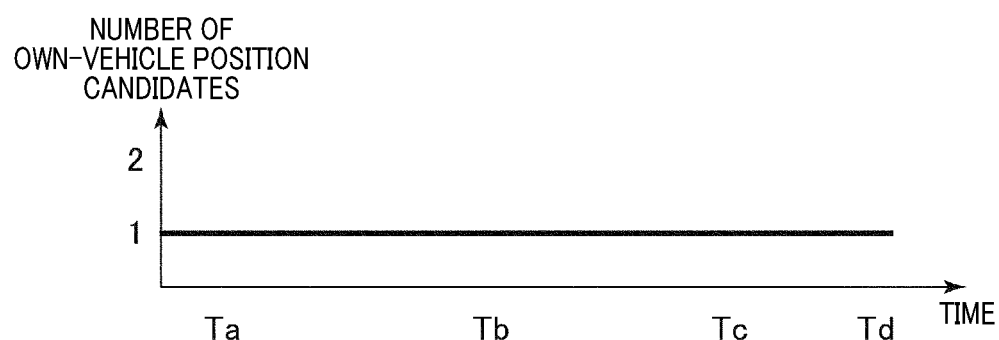

The following describes a second example of initialization of the correction-amount integrated value with reference to FIGS. 19A to 19D. FIG. 19A shows a transition of the position of the own vehicle and a transition of the confidence level. FIG. 19B shows a transition of the lane-change probability. FIG. 19C shows a transition of the correction-amount integrated value. FIG. 19D shows a transition of the number of own-vehicle-position candidates.

FIG. 19A shows the own-vehicle absolute positions 40(*a*) and 40(*b*) and the confidence levels 50(*a*) and 50(*b*) corresponding thereto, respectively. The own vehicle reaches the own-vehicle absolute position 40(*b*) at the time point Tb after lapse of the predetermined time from the own-vehicle absolute position 40(*a*) corresponding to the time point Ta.

As the own-vehicle absolute position at the time point Tc after lapse of the next predetermined time, the self-localization measurement unit 101, the vehicle-momentum measurement unit 102, and the dead reckoning unit 106, which serve as the position calculation unit, calculate the own-vehicle absolute position 40(*c*2). The localization estimation unit 108 calculates the corrected own-vehicle position 40(*c*1) as the corrected own-vehicle position.

Correcting the own-vehicle absolute position 40(*c*2) to the corrected own-vehicle position 40(*c*1) results in the estimated-position correction amount being larger. Thus, the confidence-level adjustment control is performed such that the estimation-error correction amount also increases in accordance with an increase of the estimation-position correction amount. Executing the confidence-level adjustment control, which is similar to that described with reference to FIG. 16 and FIG. 17, enables the confidence level 50(*c*1) to expand to the confidence level 50(*c*2).

In the second example shown in FIG. 19, even at the time point Tc, the correction-amount integrated value does not exceed the integration threshold. If the correction-amount integrated value does not exceed the integration threshold even after the predetermined time have elapsed, the localization estimation unit 108 initializes the correction-amount integrated value. Since the correction-amount integrated value has not exceeded the integration threshold, the number of candidates of the corrected own-vehicle position remains one. At the time point Td, the localization estimation unit 108 generates the corrected own-vehicle position 40($d1$) and the confidence level 50($d1$) corresponding thereto.

Figure 20A:
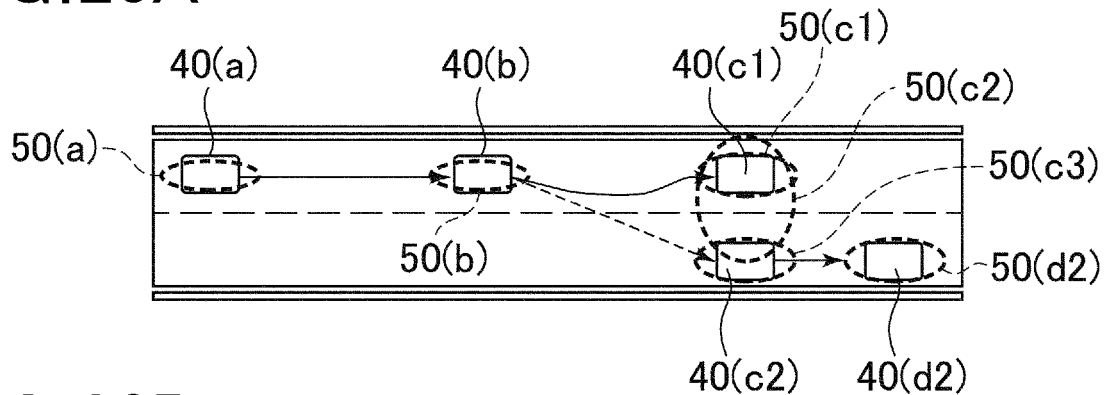
Figure 20B:
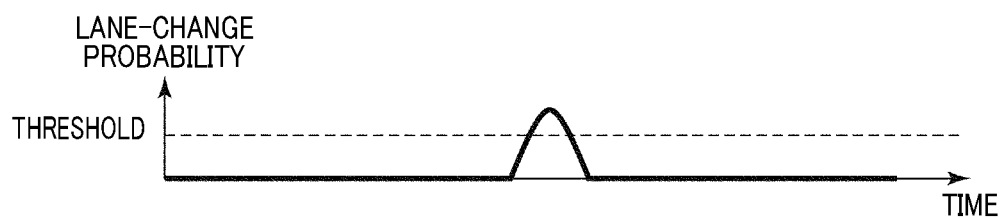
Figure 20C:
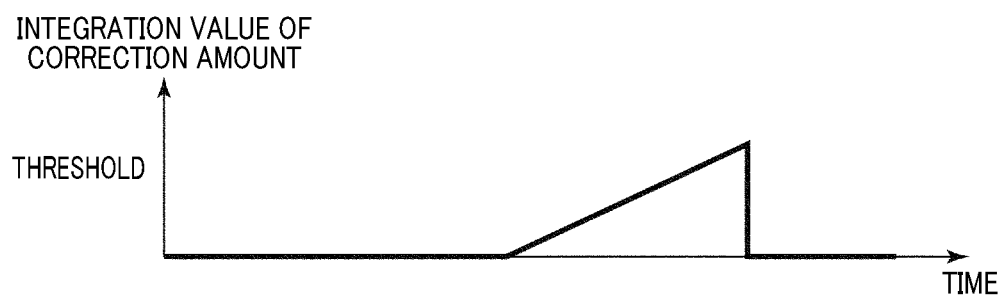
Figure 20D:
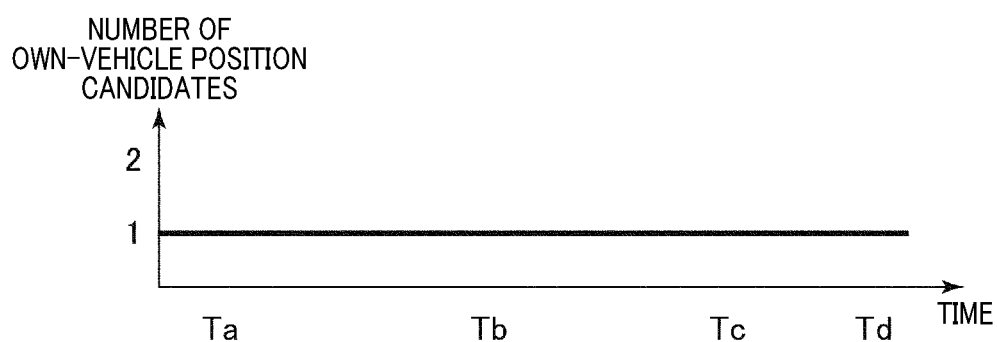

The following describes a third example of initialization of the correction-amount integrated value with reference to FIGS. 20A to 20D. FIG. 20A shows a transition of the position of the own vehicle and a transition of the confidence level. FIG. 20B shows a transition of the lane-change probability. FIG. 20C shows a transition of the correction-amount integrated value. FIG. 20D shows a transition of the number of own-vehicle-position candidates.

FIG. 20A shows the own-vehicle absolute positions 40($a$) and 40($b$) and the confidence levels 50($a$) and 50($b$) corresponding thereto, respectively. The own vehicle reaches the own-vehicle absolute position 40($b$) at the time point Tb after lapse of the predetermined time from the own-vehicle absolute position 40($a$) corresponding to the time point Ta.

As the own-vehicle absolute position at the time point Tc after lapse of the next predetermined time, the self-localization measurement unit 101, the vehicle-momentum measurement unit 102, and the dead reckoning unit 106, which serve as the position calculation unit, calculate the own-vehicle absolute position 40($c2$). The localization estimation unit 108 calculates the corrected own-vehicle position 40($c1$) as the corrected own-vehicle position.

Correcting the own-vehicle absolute position 40($c2$) to the corrected own-vehicle position 40($c1$) results in the estimated-position correction amount being larger. Thus, the confidence-level adjustment control is performed such that the estimation-error correction amount also increases in accordance with an increase of the estimation-position correction amount. Executing the confidence-level adjustment control, which is similar to that described with reference to FIG. 16 and FIG. 17, enables the confidence level 50($c1$) to expand to the confidence level 50($c2$).

In the third example shown in FIG. 20, even at the time point Tc, the correction-amount integrated value does not exceed the integration threshold. If the correction-amount integrated value does not exceed the integration threshold even after the predetermined time have elapsed, the localization estimation unit 108 initializes the correction-amount integrated value.

Further, the own-vehicle absolute position is calculated to have a confidence level 50($c3$) using a calculation method different from the calculation method by which the own-vehicle absolute positions are calculated, such as a calculation method using the line-pattern detection, the GNSS, and/or the lateral-position detection. This enables a priority to be given to the confidence level 50($c3$). At the time point Td, the localization estimation unit 108 generates the corrected own-vehicle position 40($d2$) and the confidence level 50($d2$) corresponding thereto.

The localization estimation unit 108 in this embodiment is capable of initializing the correction-amount integrated value when an additional own-vehicle absolute position and the own-vehicle position are different from each other.

Assuming that the own-vehicle absolute position used in the confidence-level adjustment control is calculated by the position calculation unit using a first calculation method, the additional own-vehicle absolute position is calculated by the position calculation unit using a second calculation method different from the first calculation method.

The own-vehicle position is specified from the corrected own-vehicle position and from the predetermined confidence level around the corrected own-vehicle position. Initializing the correction-amount integrated value enables the priority to be given to the own-vehicle absolute position calculated by the calculation method different from the calculation method used in the confidence-level adjustment control.

Next, the following describes another example of the confidence-level adjustment control. In the confidence-level adjustment control, the localization estimation unit 108 in this embodiment is capable of maintaining (1) A first corrected own-vehicle position that is set by correcting the own-vehicle absolute position by a first correction amount based on a first hypothesis (2) A second corrected own-vehicle position that is set by correcting the own-vehicle absolute position by a second correction amount based on a second hypothesis different from the first hypothesis Using the first correction amount and the second correction amount different from each other enables the first corrected own-vehicle position and the second corrected own-vehicle position different from each other in degree of correction to be maintained. Even when divergence between the own-vehicle absolute position and the corrected own-vehicle position increases, tracking can be performed based on the plurality of hypotheses. This results in an increase in a likelihood that the real own-vehicle position is within a predetermined confidence level around each of the first corrected own-vehicle position and the second corrected own-vehicle position.

Figure 21A:
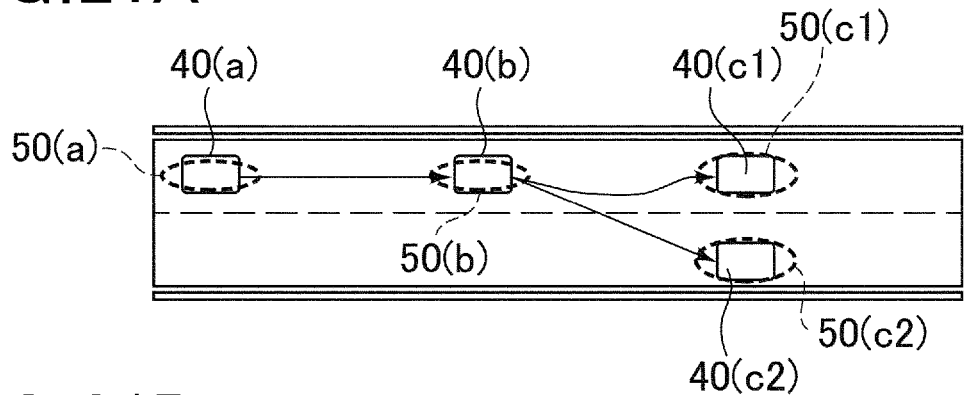
Figure 21B:
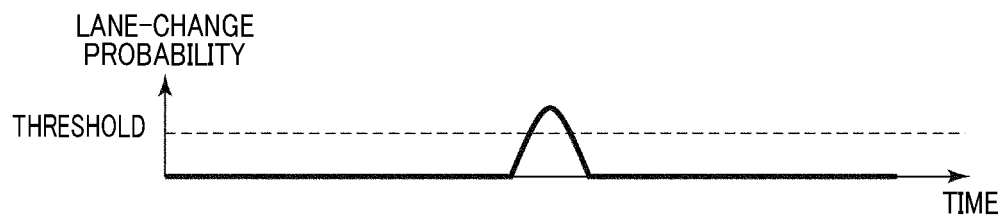
Figure 21C:
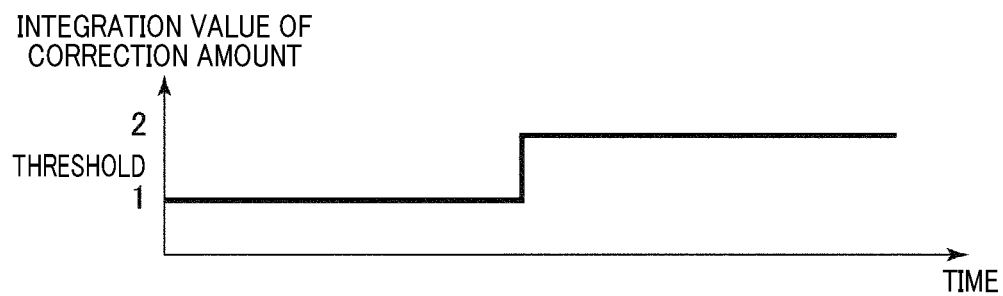
Figure 21D:
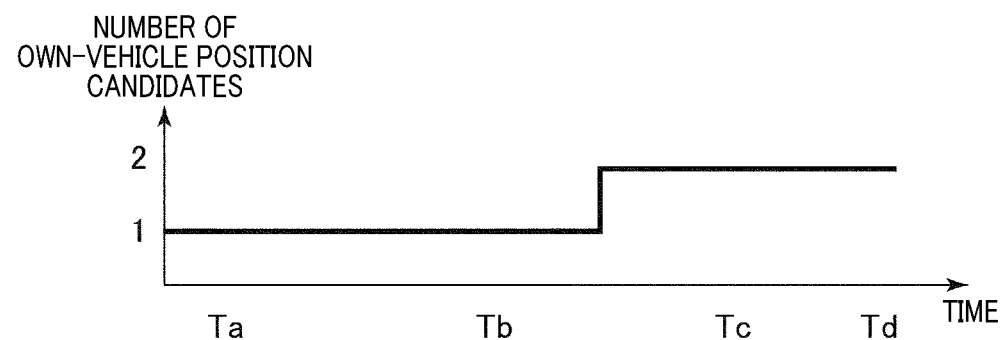

The following describes a second example of the above confidence-level adjustment control with reference to FIGS. 21A to 21D. FIG. 21A shows a transition of the position of the own vehicle and a transition of the confidence level. FIG. 21B shows a transition of the lane-change probability. FIG. 21C shows a transition of the number of own-vehicle-position candidates. FIG. 21D shows a transition of the number of lane candidates.

FIG. 21A shows the own-vehicle absolute positions 40($a$) and 40($b$) and the confidence levels 50($a$) and 50($b$) corresponding thereto, respectively. The own vehicle reaches the own-vehicle absolute position 40($b$) at the time point Tb after lapse of the predetermined time period from the own-vehicle absolute position 40($a$) corresponding to the time point Ta.

At the time point Tb, the lane-change probability exceeds a predetermined probability, and hence the localization estimation unit 108 starts the confidence-level adjustment control.

Specifically, the localization estimation unit 108 sets two own-vehicle position candidates and two lane candidates. At the time point Tc, the localization estimation unit 108 generates a first corrected own-vehicle position 40($c1$) and maintains the first corrected own-vehicle position 40($c1$) together with the confidence level 50($c1$) on a premise that the own vehicle is travelling in the lane on the left in the travelling direction. At the same time, the localization estimation unit 108 generates a second corrected own-vehicle position 40($c2$) and maintains the second corrected own-vehicle position 40($c2$) together with the confidence level 50($c2$) on a premise that the own vehicle is travelling in the lane on the right in the travelling direction.

The first corrected own-vehicle position 40($c1$) is a corrected own-vehicle position generated by correcting the own-vehicle absolute position with respect to an information item for specifying a position in the lane on the left in the travelling direction. Thus, a correction amount for the first corrected own-vehicle position 40(*c*1) corresponds to the first correction amount.

The second corrected own-vehicle position 40(*c*2) is a corrected own-vehicle position generated by correcting the own-vehicle absolute position with respect to an information item for specifying a position in the lane on the right in the travelling direction. Thus, a correction amount for the second corrected own-vehicle position 40(*c*2) corresponds to the second correction amount based on the hypothesis different from that of the first correction amount.

The localization estimation unit 108 in this embodiment is capable of rejecting the first corrected own-vehicle position or the second corrected own-vehicle position when a difference in the lateral direction between the first corrected own-vehicle position and the second corrected own-vehicle position does not exceed a lateral-direction threshold. Rejecting at least one of the first corrected own-vehicle position and the second corrected own-vehicle position when the difference in the lateral direction between the first corrected own-vehicle position and the second corrected own-vehicle position does not exceed the lateral-direction threshold enables the tracking based on the plurality of hypotheses to be cancelled, resulting in a reduction of load in the multiple tracking.

The localization estimation unit 108 in this embodiment is capable of starting the confidence-level adjustment control when the lane-change probability, which is the probability indicating the likelihood that the own vehicle moves from a lane in which the own vehicle is currently travelling to another lane, exceeds the predetermined probability.

Since the localization estimation unit 108 starts the confidence-level adjustment control when the own vehicle is estimated to move from the lane in which the own vehicle is currently travelling to another lane, the localization estimation unit 108 calculates the first corrected own-vehicle position and the second corrected own-vehicle position in accordance with an increase of the likelihood that the own vehicle makes a lane change. This reduces unnecessary tracking based on the plurality of hypotheses.

Figure 22A:
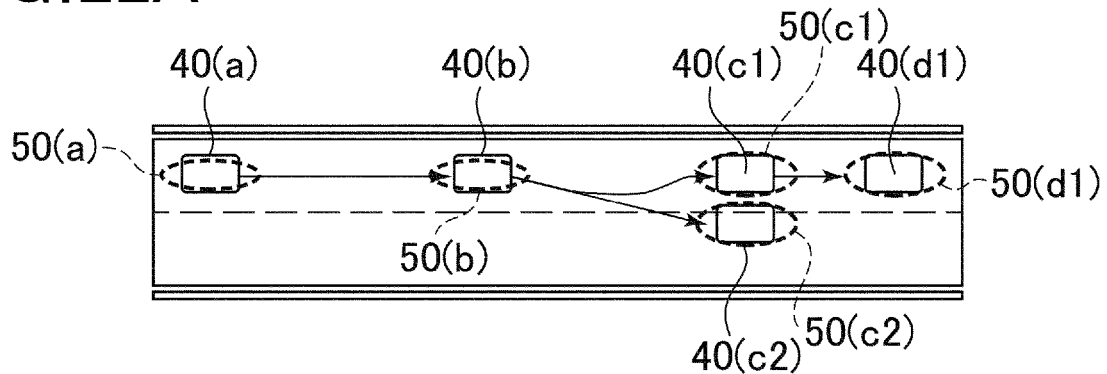
Figure 22B:
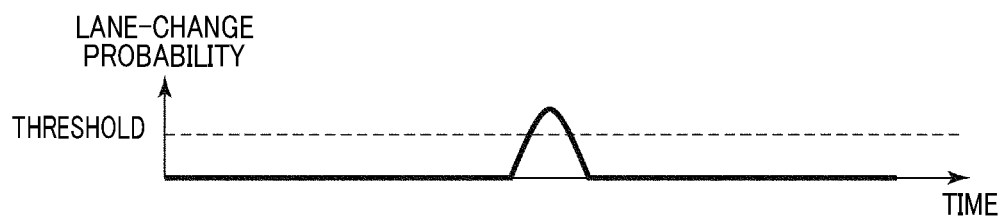
Figure 22C:
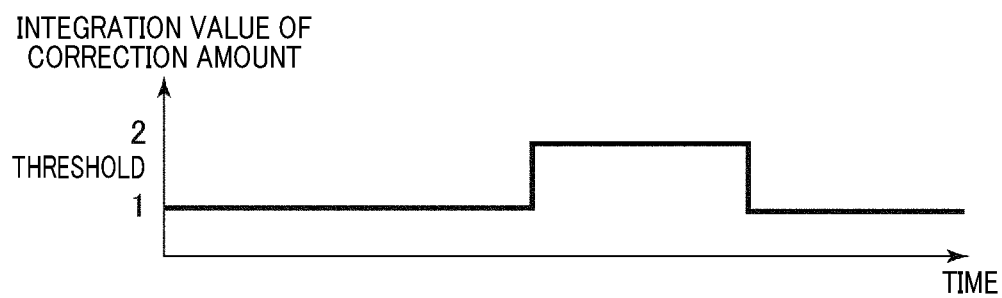
Figure 22D:
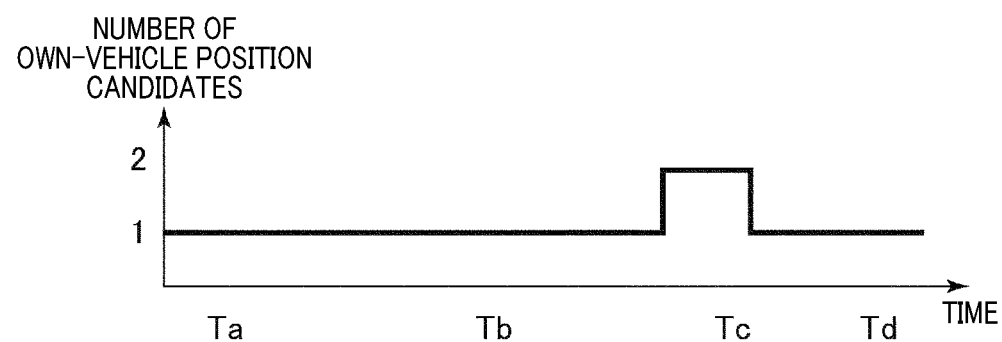

The following describes a third example of the above confidence-level adjustment control for rejecting the second corrected own-vehicle position while maintaining the first corrected own-vehicle position with reference to FIGS. 22A to 22D. FIG. 22A shows a transition of the position of the own vehicle and a transition of the confidence level. FIG. 22B shows a transition of the lane-change probability. FIG. 22C shows a transition of the number of own-vehicle-position candidates. FIG. 22D shows a transition of the number of lane candidates. FIGS. 22A to 22D show that the own vehicle reaches the own-vehicle absolute position 40(*b*) at the time point Tb after lapse of the predetermined time from the own-vehicle absolute position 40(*a*) corresponding to the time point Ta.

At the time point Tb, the lane-change probability exceeds the predetermined probability, and hence the localization estimation unit 108 starts the confidence-level adjustment control.

Specifically, the localization estimation unit 108 sets the two own-vehicle position candidates and the two lane candidates. At the time point Tc, the localization estimation unit 108 generates the first corrected own-vehicle position 40(*c*1) and maintains the first corrected own-vehicle position 40(*c*1) together with the confidence level 50(*c*1) on the premise that the own vehicle is travelling in the lane on the left in the travelling direction. At the same time, the localization estimation unit 108 generates the second corrected own-vehicle position 40(*c*2) and maintains the second corrected own-vehicle position 40(*c*2) together with the confidence level 50(*c*2) on the premise that the own vehicle is travelling in the lane on the right in the travelling direction.

As shown in FIG. 22A, at the time point Tc, a deviation in the lateral direction of the second corrected own-vehicle position 40(*c*2) from the first corrected own-vehicle position 40(*c*1) is small, and the difference in the lateral direction has not exceeded the lateral-direction threshold. Thus, the localization estimation unit 108 rejects the second corrected own-vehicle position 40(*c*2). At the time point Td, the above-described first corrected own-vehicle position 40(*d*1) and the confidence level 50(*d*1) are maintained.

The localization estimation unit 108 in this embodiment is capable of rejecting the first corrected own-vehicle position when the own-vehicle absolute position and the own-vehicle position are different from each other. The own-vehicle absolute position is calculated by the calculation method different from the calculation method for the own-vehicle absolute position used in the confidence-level adjustment control. The own-vehicle position is specified from the first corrected own-vehicle position and from the predetermined confidence level around the first corrected own-vehicle position.

The localization estimation unit 108 in this embodiment is capable of rejecting the second corrected own-vehicle position when the own-vehicle absolute position and the own-vehicle position are different from each other. The own-vehicle absolute position is calculated by the calculation method different from the calculation method for the own-vehicle absolute position used in the confidence-level adjustment control. The own-vehicle position is specified from the second corrected own-vehicle position and from the predetermined confidence level around the second corrected own-vehicle position.

Rejecting one of the first and second corrected own-vehicle positions, which is apart from the own-vehicle absolute position calculated by the calculation techniques different from the calculation technique used in the confidence-level adjustment control, enables the load in the multiple tracking to be reduced.

The following describes a fourth example of the above confidence-level adjustment control for rejecting the first corrected own-vehicle position while maintaining the second corrected own-vehicle position with reference to FIGS. 23A to 23D. FIG. 23A shows a transition of the position of the own vehicle and a transition of the confidence level. FIG. 23B shows a transition of the lane-change probability. FIG. 23C shows a transition of the number of own-vehicle-position candidates. FIG. 23D shows a transition of the number of lane candidates. FIGS. 23A to 23D show that the own vehicle reaches the own-vehicle absolute position 40(*b*) at the time point Tb after lapse of the predetermined time from the own-vehicle absolute position 40(*a*) corresponding to the time point Ta.

At the time point Tb, the lane-change probability exceeds the predetermined probability, and hence the localization estimation unit 108 starts the confidence-level adjustment control.

Specifically, the localization estimation unit 108 sets the two own-vehicle position candidates and the two lane candidates. At the time point Tc, the localization estimation unit 108 generates the first corrected own-vehicle position 40(*c*1) and maintains the first corrected own-vehicle position 40(*c*1) together with the confidence level 50(*c*1) on the premise that the own vehicle is travelling in the lane on the left in the travelling direction. At the same time, the localization estimation unit 108 generates the second corrected own-vehicle position 40(*c*2) and maintains the second corrected own-vehicle position 40(*c*2) together with the confidence level 50(*c*2) on the premise that the own vehicle is travelling in the lane on the right in the travelling direction.

As shown in FIG. 23A, at the time point Tc, the own-vehicle absolute position is calculated to have the confidence level 50(*c*3) using a calculation method different from the calculation method by which the own-vehicle absolute positions are calculated, such as a calculation method using the line-pattern detection, the GNSS, and/or the lateral-position detection. This enables a priority to be given to the confidence level 50(*c*3).

The localization estimation unit 108 maintains the second corrected own-vehicle position 40(*c*2) close to the confidence level 50(*c*3). At the time point Td, based on the second corrected own-vehicle position 40(*c*2), the localization estimation unit 108 generates the corrected own-vehicle position 40(*d*2) and the confidence level 50(*d*2) corresponding thereto.

Next, the following describes a first routine carried out by the self-localization estimation device 10 in accordance with the flowchart of FIG. 24.

In Step S101, the self-localization measurement unit 101, the vehicle-momentum measurement unit 102, and the dead reckoning unit 106 serve as the position calculation unit to calculate an own-vehicle absolute position.

In Step S102 subsequent to Step S101, the map-information acquisition unit 109 acquires surrounding-area map data surrounding the own vehicle. In Step S103 subsequent to Step S102, the localization estimation unit 108 calculates a corrected own-vehicle position in consideration of a lane profile.

Step S104 subsequent to Step S103 adds an amount of the correction, which is calculated in Step S103, to a correction-amount integrated value. Step S105 subsequent to Step S104 determines whether the correction-amount integrated value has exceeded a threshold. When the correction-amount integrated value has exceeded the threshold, the procedure proceeds to a process of Step S107. When the correction-amount integrated value has not exceeded the threshold, the procedure proceeds to a process of Step S106.

Step S106 initializes the correction-amount integrated value when a predetermined condition has been satisfied. Step S107 determines whether an own-vehicle absolute position has been calculated by a method different from that in Step S101. When the own-vehicle absolute position has been calculated by the method different from that in Step S101, the procedure proceeds to a process of Step S108. When the own-vehicle absolute position has been calculated by the method that is the same as the method in Step S101, the procedure returns to the process of Step S101.

Step S108 calculates estimation errors. Step S109 subsequent to Step S108 initializes the correction-amount integrated value. Step S110 determines whether the correction-amount integrated value has exceeded the threshold.

When the correction-amount integrated value has exceeded the threshold, the procedure proceeds to a process of Step S111. When the correction-amount integrated value has not exceeded the threshold, the procedure proceeds to a process of Step S113.

Step S111 increases the number of one or more estimated-position candidates. Step S112 subsequent to Step S111 initializes the correction-amount integrated value.

Step S113 determines whether the number of the one or more estimated-position candidates is a plural number. When the number of the one or more estimated-position candidates is a plural number, the procedure proceeds to a process of Step S114. When the number of the one or more estimated-position candidates is not a plural number, the procedure returns to the main routine.

Step S114 determines whether to reject at least one of the estimated-position candidates.

Next, the following describes a second routine carried out by the self-localization estimation device 10 in accordance with the flowchart of FIG. 25.

In Step S201, the self-localization measurement unit 101, the vehicle-momentum measurement unit 102, and the dead reckoning unit 106 serve as the position calculation unit to calculate an own-vehicle absolute position.

In Step S202 subsequent to Step S201, the map-information acquisition unit 109 acquires the surrounding-area map data surrounding the own vehicle. Step S203 subsequent to Step S202 calculates a lane-change probability.

Step S204 subsequent to Step S203 determines whether the number of one or more estimated-position candidates is one. When the number of the one or more estimated-position candidates is one, the procedure proceeds to a process of Step S205. When the number of the one or more estimated-position candidates is more than one, the procedure proceeds to a process of Step S208.

Step S205 determines whether the lane-change probability has exceeded a threshold. When the lane-change probability has exceeded the threshold, the procedure proceeds to a process of Step S206. When the lane-change probability has not exceeded the threshold, the procedure proceeds to a process of Step S207.

Step S206 generates an additional estimation-position candidate based on a modified correction parameter. Step S207 performs position correction of the additional estimation-position candidate based on the lane profile.

Step S208 subsequent to Step S206 and Step S207 performs position correction of all the estimated position candidates based on the lane profile. Step S209 subsequent to Step S208 determines whether a lateral moving distance per unit travelling distance has exceeded a threshold.

When the lateral moving distance per unit travelling distance has exceeded the threshold, the procedure proceeds to a process of Step S210. When the lateral moving distance per unit travelling distance has not exceeded the threshold, the procedure proceeds to a process of Step S211.

Step S210 rejects at least one of the estimated-position candidates. Step S211 determines whether the own-vehicle absolute position has been calculated by a method different from that in Step S201. When the own-vehicle absolute position has been calculated by the method different from that in Step S101, the procedure proceeds to a process of Step S212. When the own-vehicle absolute position has been calculated by the method that is the same as the method in Step S201, the procedure returns to the process of Step S201.

Step S212 rejects at least one of the estimated-position candidates.

With regard to the description of the embodiment of the present disclosure, which has been made hereinabove by way of the specific examples, the present disclosure is not limited to these specific examples. As long as the features of the present disclosure are included, design variations of these specific examples, which persons skilled in the art make as appropriate, are also encompassed within the scope of the present disclosure. The components, their arrangement, conditions, shapes, and the like are not limited to those exemplified in the above-described specific examples, and may be changed as appropriate. Unless a technical contradiction arises, combinations of the components in the above-described specific examples may be changed as appropriate.

What is claimed is:

1. A self-localization estimation device comprising:
a map-information acquisition unit that acquires map information including lane information for specifying lanes in which vehicles are enabled to travel;
a position calculation unit that calculates an own-vehicle absolute position being an absolute position of an own vehicle; and
a position estimation unit that estimates, based on the map information and the own-vehicle absolute position, a corrected own-vehicle position being a corrected position of the own vehicle,
wherein:
the position estimation unit estimates the corrected own-vehicle position by comparing a reliability of the map information with a reliability of the own-vehicle absolute position.

2. The self-localization estimation device according to claim 1, wherein the position estimation unit is configured to:
vary at least one of the reliability of the map information and the reliability of the own-vehicle absolute position to thereby change relative weights assigned to the respective map information and own-vehicle absolute position; and
estimate the corrected own-vehicle position based on the map information and the own-vehicle absolute position respectively having the changed relative weights.

3. The self-localization estimation device according to claim 2, wherein
the position estimation unit is configured to vary the reliability of the map information by using a lane-change probability, the lane-change probability being a probability indicating a likelihood that the own vehicle moves from a current lane in which the own vehicle is currently travelling to another lane.

4. The self-localization estimation device according to claim 3, wherein the position estimation unit is configured to:
maintain or reduce the reliability of the map information when the lane-change probability increases; and
increase the reliability of the map information when the lane-change probability decreases.

5. The self-localization estimation device according to claim 3, wherein
the position estimation unit is configured to calculate the lane-change probability based on a lane divergence amount, the lane divergence amount being an amount of divergence of a travelling condition of the own vehicle with respect to information about how the current lane extends.

6. The self-localization estimation device according to claim 5, wherein
the position estimation unit is configured to calculate the lane divergence amount based on at least one of:
an azimuth deviation being a difference between an azimuth of the current lane and an azimuth of a travelling direction of the own vehicle;
a yaw rate of the own vehicle;
a yaw angle of the own vehicle;
a steering angle of the own vehicle; and
Surrounding-environment information about a place where the own vehicle is currently travelling.

7. The self-localization estimation device according to claim 1, wherein
the reliability of the map information is represented by a map-information probability distribution;
the reliability of the own-vehicle absolute position is represented by an own-vehicle-position probability distribution; and
the position estimation unit is configured to estimate the corrected own-vehicle position by comparing the map-information probability distribution with the own-vehicle-position probability distribution.

8. The self-localization estimation device according to claim 7, wherein
the map-information probability distribution includes a probability distribution of a current lane in which the own vehicle is currently travelling or a lane center position.

9. The self-localization estimation device according to claim 1, wherein
the position estimation unit is configured to:
obtain line-pattern information about at least one marking line acquired by a camera; and
reflect the line-pattern information on the estimation of the corrected own-vehicle position.

10. The self-localization estimation device according to claim 1, wherein
the position estimation unit is configured to:
obtain surrounding-environment information item acquired by a camera; and
reflect the surrounding-environment information on the estimation of the corrected own-vehicle position.

11. The self-localization estimation device according to claim 1, wherein
the position estimation unit is configured to reflect turn-signal information item on the estimation of the corrected own-vehicle position.

12. The self-localization estimation device according to claim 1, wherein
the position estimation unit is configured to reflect a condition of a driver on the estimation of the corrected own-vehicle position.

13. The self-localization estimation device according to claim 1, wherein
the position estimation unit is configured to reflect an operation by a driver on the estimation of the corrected own-vehicle position.

14. The self-localization estimation device according to claim 1, wherein
the position estimation unit is configured to perform confidence-level adjustment control to reduce a confidence level of the corrected own-vehicle position in accordance with a correction amount by which the own-vehicle absolute position is corrected to the corrected own-vehicle position.

15. The self-localization estimation device according to claim 14, wherein
the position estimation unit is configured to reduce the confidence level of the corrected own-vehicle position in accordance with a correction-amount integrated value that is the sum of previously used correction amounts.

16. The self-localization estimation device according to claim 15, wherein
the position estimation unit is configured to initialize the correction-amount integrated value when the correction-amount integrated value does not exceed an integration threshold that is set in accordance with a predetermined elapsed time period.

17. The self-localization estimation device according to claim 15, wherein
the position calculation unit is configured to:
calculate, as the own-vehicle absolute position used in the confidence-level adjustment control, a first own-vehicle absolute position using a first calculation method; and
calculate a second own-vehicle absolute position using a second calculation method different from the first calculation method; and
the position estimation unit is configured to initialize the correction-amount integrated value when the second own-vehicle absolute position and an own-vehicle position are different from each other,
the own-vehicle position being specified from the corrected own-vehicle position and from a predetermined confidence level around the corrected own-vehicle position.

18. The self-localization estimation device according to claim 14, wherein
the position estimation unit is configured to maintain, in the confidence-level adjustment control:
a first corrected own-vehicle position that is set by correcting the own-vehicle absolute position by a first correction amount based on a first hypothesis; and
a second corrected own-vehicle position that is set by correcting the own-vehicle absolute position by a second correction amount based on a second hypothesis different from the first hypothesis.

19. The self-localization estimation device according to claim 18, wherein
the position estimation unit is configured to reject the first corrected own-vehicle position or the second corrected own-vehicle position when a difference in a lateral direction between the first corrected own-vehicle position and the second corrected own-vehicle position does not exceed a lateral-direction threshold.

20. The self-localization estimation device according to claim 18, wherein
the position calculation unit is configured to:
calculate, as the own-vehicle absolute position used in the confidence-level adjustment control, a first own-vehicle absolute position using a first calculation method; and
calculate a second own-vehicle absolute position using a second calculation method different from the first calculation method; and
the position estimation unit is configured to:
reject the first corrected own-vehicle position when the second own-vehicle absolute position and a first own-vehicle position are different from each other,
the first own-vehicle position being specified from the first corrected own-vehicle position and from a predetermined confidence level around the first corrected own-vehicle position; and
reject the second corrected own-vehicle position when the second own-vehicle absolute position and a second own-vehicle position are different from each other,
the second own-vehicle position being specified from the second corrected own-vehicle position and from a predetermined confidence level around the second corrected own-vehicle position.

21. The self-localization estimation device according to claim 18, wherein
the position estimation unit is configured to start the confidence-level adjustment control when a lane-change probability exceeds a predetermined probability,
the lane-change probability being a probability indicating a likelihood that the own vehicle moves from a lane in which the own vehicle is currently travelling to another lane.

* * * * *